US006967926B1

(12) United States Patent
Williams, Jr. et al.

(10) Patent No.: US 6,967,926 B1
(45) Date of Patent: Nov. 22, 2005

(54) METHOD AND APPARATUS FOR USING BARRIER PHASES TO LIMIT PACKET DISORDER IN A PACKET SWITCHING SYSTEM

(75) Inventors: John J. Williams, Jr., Pleasanton, CA (US); Thomas Dejanovic, Sunnyvale, CA (US); Jonathan E. Michelson, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

(21) Appl. No.: 09/752,422

(22) Filed: Dec. 31, 2000

(51) Int. Cl.$^7$ .......................... H04L 12/00; H04L 12/56
(52) U.S. Cl. ................ 370/236; 370/386; 370/413; 370/426; 370/390
(58) Field of Search ....................... 370/229, 230.1, 370/312, 355, 356, 359, 394, 428, 429, 236, 370/360, 389, 390, 410, 412, 413, 419, 426, 370/477, 231, 235

(56) References Cited

U.S. PATENT DOCUMENTS 4,491,945 A    1/1985 Turner (Continued)

OTHER PUBLICATIONS

David A. Patterson & John L. Hennessy, "Computer Organization and Design: the Hardware/Software Interface," 1998, Morgan Kaufmann Publishers, Inc., pp. 710-726 & G-1.

(Continued)

Primary Examiner—John Pezzlo
Assistant Examiner—Ahmed Elallam
(74) Attorney, Agent, or Firm—The Law Office of Kirk D. Williams

(57) ABSTRACT

Methods and apparatus are disclosed for using barrier phases to limit the disorder of packets which may be used in a computer or communications system. In one packet switching system, source nodes include an indication of their current barrier state in sent packets. For each barrier state, a predetermined range of sequence numbers may be used or a predetermined number of packets may be sent by a source node. The source, destination, and switching nodes are systematically switched between barrier phases, which is typically performed continuously in response to the flow of barrier request and barrier acknowledgement packets or signals. Each source node broadcasts to all forward connected nodes a barrier request to change to a next barrier state. After a switching node has received a barrier request on all incoming links, the switching node propagates the barrier request. Upon receiving barrier requests over all links, each destination stage relays an acknowledgement message to all connected source elements, which then send a barrier acknowledgement in much the same way, and each source element changes its barrier state causing the sequence number or counting space to be reset, and newly sent packets to indicate the new barrier state. Upon receiving all its barrier acknowledgement messages, each destination stage changes its barrier state, and then the destination can manipulate (e.g., resequence, reassemble, send, place in an output queue, etc.) packets marked with the previous barrier state as it knows that every packet from the previous barrier state has been received. This transition of barrier phases and limiting the number of packets sent per barrier phases may be used to limit the range of the sequence number space and the size of outgoing, resequencing, and reassembling buffers, as well providing a packet time-out mechanism which may be especially useful when non-continuous sequence numbers or time-stamps are included in packets for resequencing and/or reassembly purposes.

12 Claims, 25 Drawing Sheets

U.S. PATENT DOCUMENTS

| | | |
|---|---|---|
| 4,494,230 A | 1/1985 | Turner |
| 4,630,260 A | 12/1986 | Toy et al. |
| 4,734,907 A | 3/1988 | Turner |
| 4,829,227 A | 5/1989 | Turner |
| 4,849,968 A | 7/1989 | Turner |
| 4,893,304 A | 1/1990 | Giacopelli et al. |
| 4,901,309 A | 2/1990 | Turner |
| 5,127,000 A | 6/1992 | Henrion |
| 5,173,897 A | 12/1992 | Schrodi et al. |
| 5,179,551 A | 1/1993 | Turner |
| 5,179,556 A | 1/1993 | Turner |
| 5,229,991 A | 7/1993 | Turner |
| 5,253,251 A | 10/1993 | Aramaki |
| 5,260,935 A | 11/1993 | Turner |
| 5,339,311 A | 8/1994 | Turner |
| 5,396,491 A | 3/1995 | Newman ............... 370/60 |
| 5,402,415 A | 3/1995 | Turner |
| 5,463,620 A | 10/1995 | Sriram ............... 370/60 |
| 5,842,040 A | 11/1998 | Hughes et al. |
| 6,061,345 A | 5/2000 | Hahn et al. ............. 370/351 |
| 6,085,303 A * | 7/2000 | Thorson et al. ............ 712/16 |
| 6,285,679 B1 | 9/2001 | Dally et al. ............. 370/413 |
| 6,418,477 B1 * | 7/2002 | Verma ............... 709/240 |
| 6,532,211 B1 * | 3/2003 | Rathonyi et al. ............ 370/230 |
| 6,654,342 B1 * | 11/2003 | Dittia et al. ............. 370/229 |
| 6,683,850 B1 * | 1/2004 | Dunning et al. ............ 370/231 |
| 6,735,173 B1 * | 5/2004 | Lenoski et al. ............ 370/235 |
| 6,760,307 B2 * | 7/2004 | Dunning et al. ............ 370/231 |
| 2001/0033569 A1 | 10/2001 | Dally ............... 370/369 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHOD AND APPARATUS FOR USING BARRIER PHASES TO LIMIT PACKET DISORDER IN A PACKET SWITCHING SYSTEM

FIELD OF THE INVENTION

This invention relates to a packet switching system of communications systems, routers, computers and communications devices; and more particularly, the invention relates to using barrier phases to limit packet disorder in a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Consumers and designers of these systems typically desire high reliability and increased performance at a reasonable price. A commonly used technique for helping to achieve this goal is for these systems to provide multiple paths between a source and a destination. Packets of information are then routed and distributed among these multiple paths. It is typically more cost-effective to provide multiple slower rate links or switching paths, than to provide a single higher rate path. Such designs also achieve other desired performance characteristics.

A typical artifact of routing across multiple links of varying delays is the need to resequence each of the streams of packets routed through a packet switch back into their original order. One known technique for routing and resequencing streams of packets is to add a sequence number to each packet and then to place packets in sequential order based on these added sequence numbers. Separate sequence numbers are typically used for each switch input-output pairing. For example, each input interface of the packet switch maintains a separate sequence number counter for each output of the packet switch; and each output interface of the packet switch maintains a separate counter for each input of the packet switch. This technique is simple, but it requires significant resources for the buffers and sequence number counters. The resources required for these buffers and counters must be sufficient to store the packets and distinguish the order of the packets for handling worst case delay differentials between paths. This problem is further compounded when contiguous sequence numbers are not used or when a packet is lost or dropped. In either of these cases, it is hard to determine whether certain packets should be forwarded immediately or should be delayed to see if the potentially dropped or lost packet or a packet with the skipped sequence number actually arrives.

Desired are improved methods and systems for routing and resequencing packets in a packet switch, especially those methods and systems which place a bound on the size requirements of sequence numbers or other resources.

SUMMARY OF THE INVENTION

Systems and methods are disclosed for using barrier phases to limit the disorder of packets in a packet switching system. One embodiment maintains a destination state in a destination of a network. At one point, the destination state is in a first state. The destination receives a first set of packets of multiple packets belonging the first state. The destination receives a barrier indication belonging to a second state. The destination manipulates at least one packet of the first set of packets in response to the received barrier indication.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
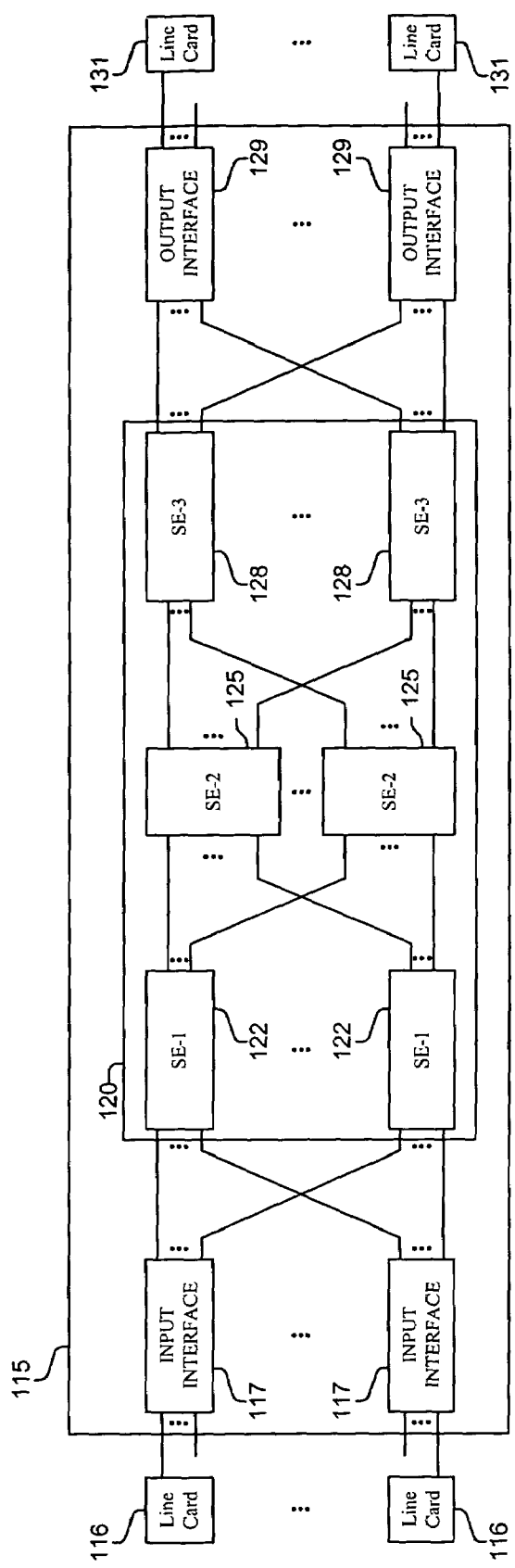
FIGS. 1A–C are block diagrams of exemplary embodiments including packet switching systems.

Methods and apparatus are disclosed for using barrier phases to limit the disorder of packets which may be used, inter alia, in a computer or communications system, such as a packet switching system, router, or other device. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Methods and apparatus are disclosed for using barrier phases to limit the disorder of packets which may be used, inter alia, in a computer or communications system, such as a packet switching system, router, or other device. It is possible that an embodiment includes one or more than one sets of barrier states. The number of barrier sets for a device is typically determined based on its characteristics, configuration, traffic patterns, and/or other criteria. For example, a packet switching system typically will have a separate barrier state for each priority and/or quality of service of traffic. For ease of understanding for the reader, certain descriptions herein will describe the actions of a single set of barrier states, while it is to be understood that one or more other sets of barrier transitions may be simultaneously and/or sequentially occurring.

In one embodiment of a packet switching system, source nodes, which distribute packets to various switching planes or elements, include an indication of their current barrier state in sent packets. For each barrier state, a predetermined range of sequence numbers may be included in packets to identify their ordering, which limits the number of packets sent by a source node for each barrier phases. In another embodiment, a counting space (rather than a sequence number space) is used to limit the maximum number of packets sent for each barrier state. Upon exhaustion of the range of sequence numbers or counting space, a source node stops sending packets until the source node transitions to the next barrier phase when this range of sequence numbers or counting space may be reset and reused.

The source, destination, and switching nodes are systematically switched among two or more barrier phases (e.g., operational states). In one embodiment, the switching between phases is performed continuously in response to the flow of barrier request and barrier acknowledgement packets or signals. In one embodiment, barrier requests are used without barrier acknowledgements. In one embodiment, the rate of switching between barrier phases is limited or additionally determined in response to a certain number of packets being sent or after a predetermined period of time. To switch between barrier phases in one embodiment, each source node broadcasts to all forward connected switching nodes a barrier request to change to a next barrier state. After a switching node has received such a barrier request on all incoming links for a particular barrier set, the switching node propagates the barrier request for the particular barrier set. If there are packets in any outgoing queues, the barrier request is typically placed in the queues after these queued packets, to ensure that the barrier request is sent to a next stage in this order. In one embodiment, another technique is used to ensure that all packets of the previous barrier phase have been forwarded before the barrier request for the next barrier phase is forwarded. These various techniques include using counters to count occupancy per barrier phase in each queue or within the particular node, and using per barrier phase queues and preferentially draining packets belonging to the previous barrier phase.

Upon receiving barrier requests over all links for a particular barrier set, each destination node relays an acknowledgement message to all connected source nodes, which then send a barrier acknowledgement in much the same way (except barrier acknowledgement messages are typically sent immediately out rather than being placed in a queue), and each source node changes its barrier state for the particular barrier set causing sent packets belonging to the barrier set to indicate the new barrier state. Upon receiving all the barrier acknowledgement messages over all links for the particular barrier set, each destination stage switches its barrier state for the particular barrier set, and then the destination can manipulate (e.g., resequence, reassemble, send, place in an output queue, etc.) packets marked with the previous barrier state as it knows that every packet from the previous barrier state has been received for the particular barrier set.

This transition of barrier phases and limiting the number of packets sent per barrier phases may be used to limit the range of the sequence number space and the size of outgoing, resequencing, and reassembling buffers, as well providing as a packet time-out mechanism which may be especially useful when non-continuous sequence numbers or time-stamps are included in packets for resequencing and/or reassembly purposes, or when a packet switching system drops packets.

FIGS. 1A–3C and their discussion herein are intended to provide a description of a few of the numerous variety of embodiments which may use a barrier scheme. A particular embodiment may use a barrier scheme in one or more locations within itself, and does not necessarily implement such a barrier scheme in all possible locations, including all the possible locations described herein in relation to the figures.

Figure 1B:
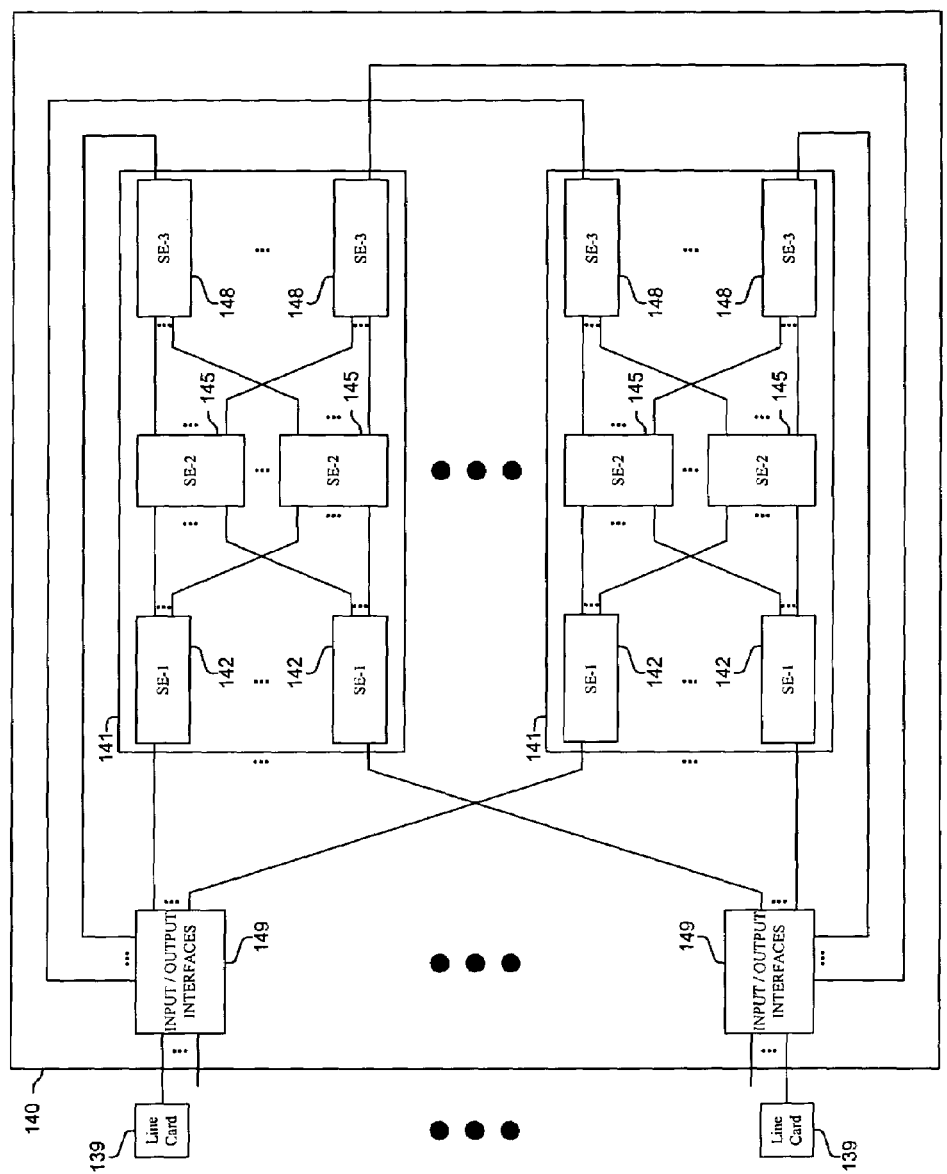
Figure 1C:
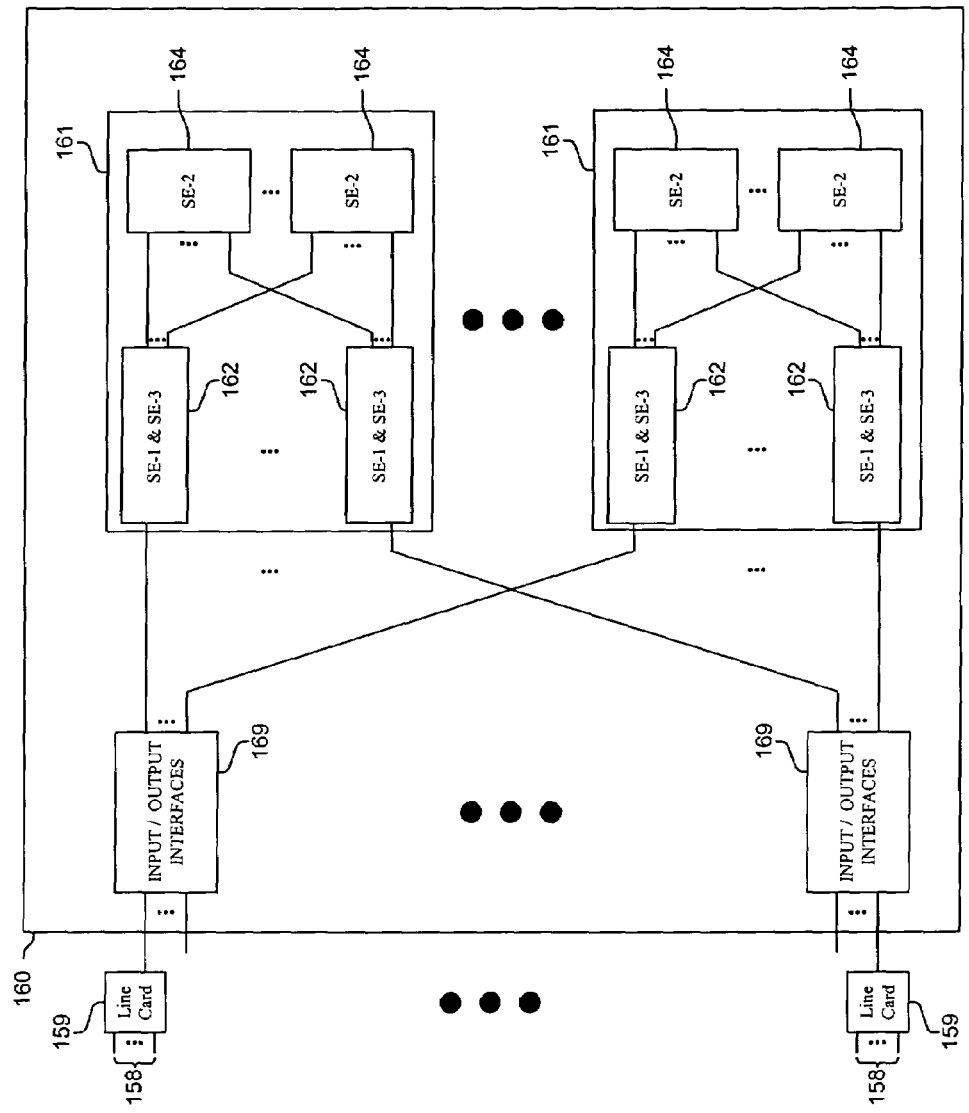

FIGS. 1A–C illustrate a few of many embodiments including different packet switching systems and topologies thereof. FIG. 1A illustrates an exemplary packet switch 115 having multiple inputs and outputs and a single interconnection network 120. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 115, 140 and 160 and line cards to which they are connected may include embodiments of a barrier scheme system as disclosed herein. Of course, the invention is not limited to these illustrated operating environments and packet switching systems, and the packet switching systems may have more or less elements.

FIG. 1A illustrates an exemplary embodiment of a packet switch 115. Packet switch 115 comprises multiple input interfaces 117, interconnection network 120, and output interfaces 129. Input interfaces 117 and output interfaces 129 are both coupled over multiple links to interconnection network 120. Line cards 116 and 131 are coupled to input interfaces 117 and output interfaces 131. In some embodiments including other packet switching topologies, line cards or their functionality may be included in the packet switch itself, or as part of the packet switching system.

In one embodiment, interconnection network 120 comprises multiple switch elements SE-1 122, SE-2 125, and SE-3 128 that are interconnected by multiple links. Line cards 116 and 131 may connect to other systems (not shown)

to provide data items (e.g., packets) to be routed by packet switch 115. Embodiments may use a barrier scheme according to the invention in one or more components, including line cards 116, 131, input interfaces 117, switch elements SE-1 122, SE-2 125, and SE-3 128, output interfaces 129, and/or other locations within packet switch 115 or the packet switching system.

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Embodiments may use a barrier scheme according to the invention in one or more components, including line cards 139, input and output interfaces 149, switch elements SE-1 142, SE-2 145, and SE-3 148, and/or other locations within packet switch 140 or the packet switching system.

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Embodiments may use a barrier scheme according to the invention in one or more components, including line cards 159, input and output interfaces 169, switch elements SE-1 & SE-3 162 and SE-2 164, and/or other locations within packet switch 160 or the packet switching system.

Figure 2A:
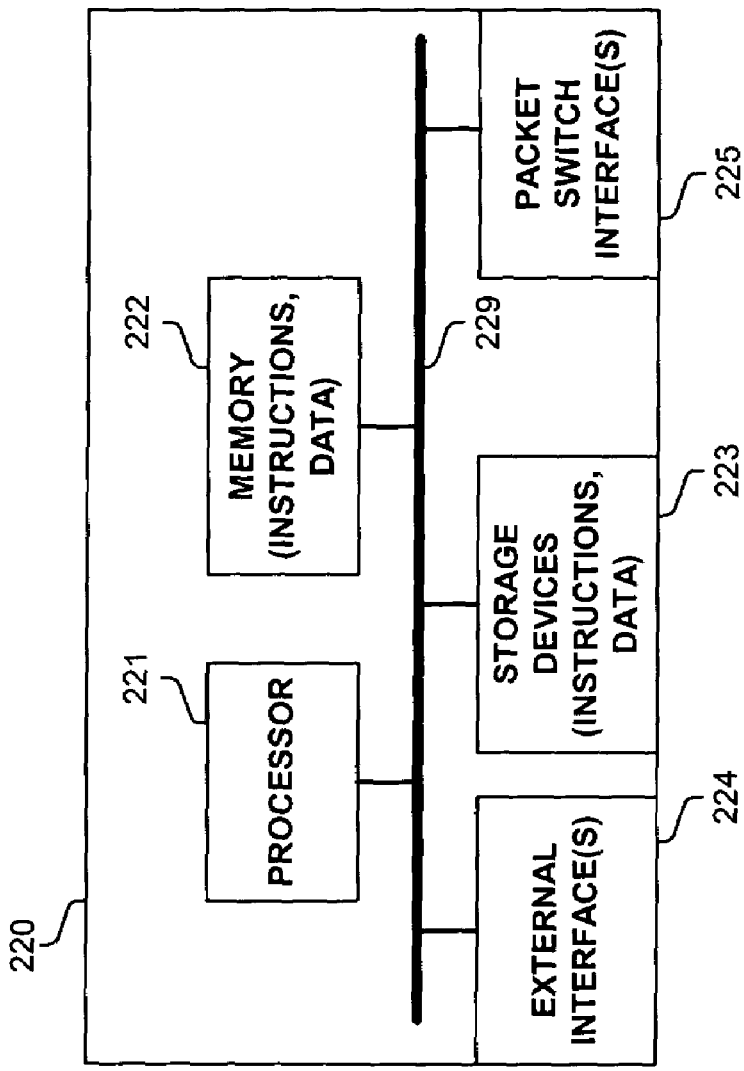
FIGS. 2A–C are block diagrams illustrating exemplary embodiments including a packet switching system component, such as, for example, a line card and/or input/output interface in which the invention may be practiced.
Figure 2B:
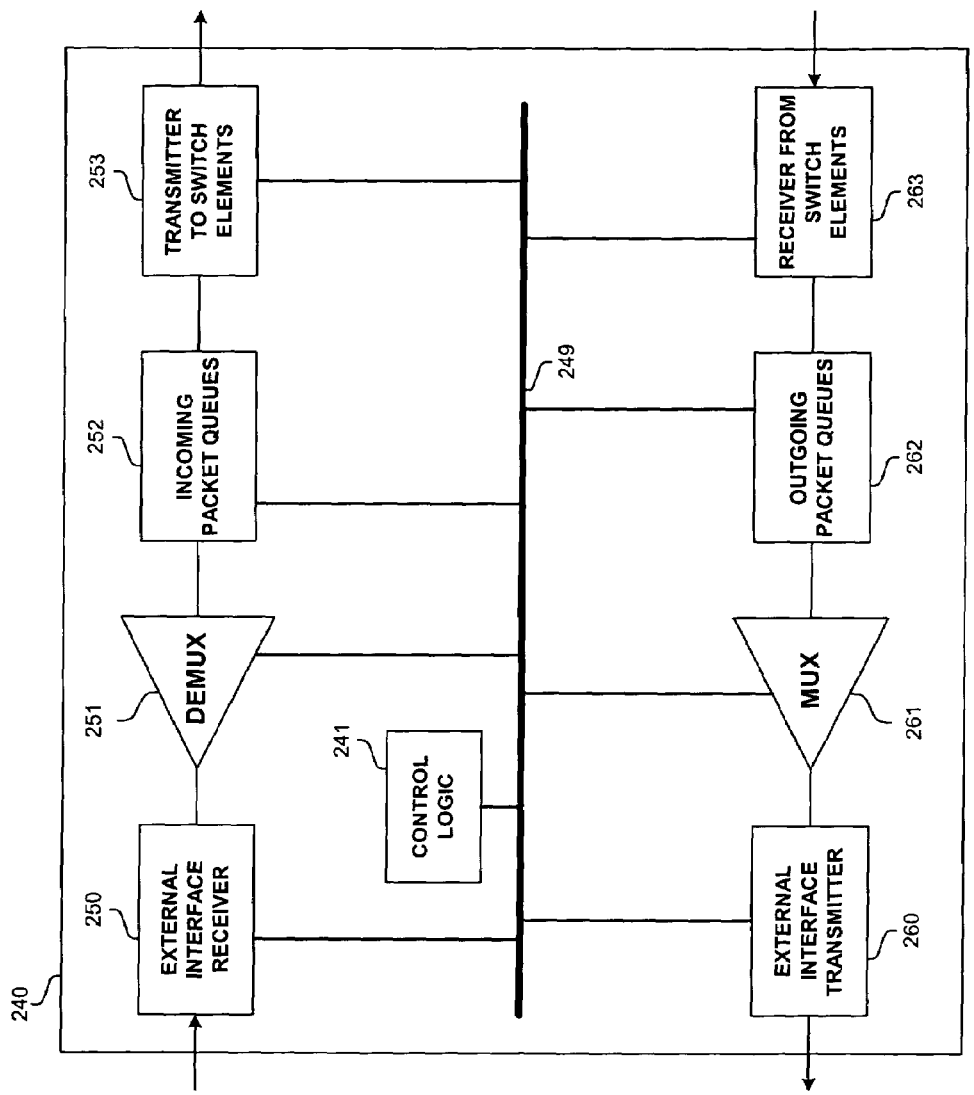
Figure 2C:
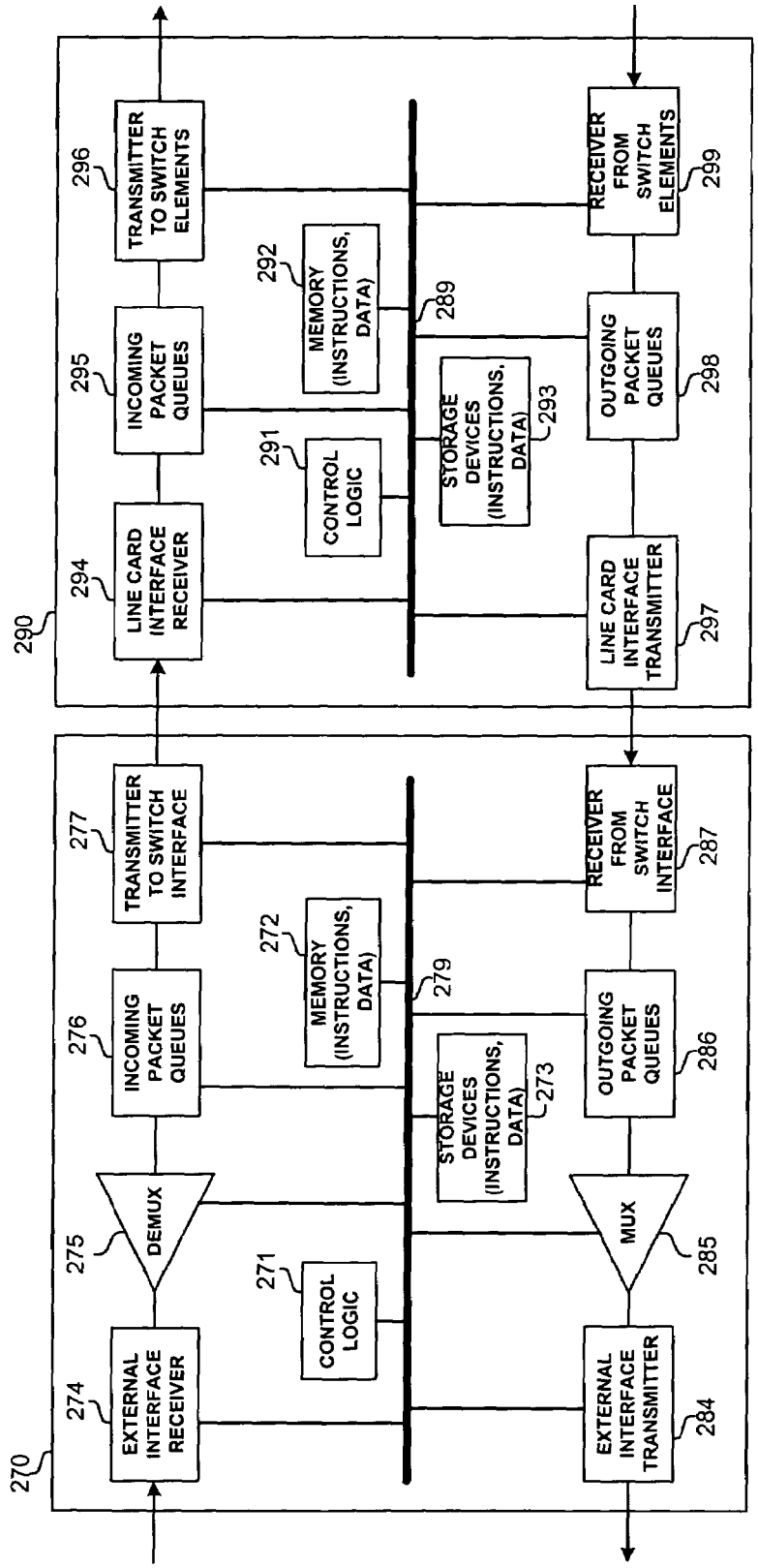

FIGS. 2A–C illustrate three of numerous possible embodiments of a line card, input interface, output interface, and/or input/output interface. For illustrative purposes, only single transmitters and receivers may be shown. It should be clear to one skilled in the art that multiple transmitters and receivers may be used to communicate with multiple sources and destinations (e.g., line cards, switch fabrics, etc.)

FIG. 2A illustrates one embodiment 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing a barrier scheme in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing a barrier scheme in accordance with certain embodiments of the invention.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates embodiment 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Embodiment 240 comprises control logic 241 implementing a barrier scheme in accordance with certain embodiments of the invention. In one embodiment control logic 241 includes memory for storage of data and instructions. Control logic 241 is connected to other components of embodiment 240 via one or more internal communications mechanisms 249 (shown as a bus for illustrative purposes). External interface receiver 250 receives external signals, separates the signals into channels using demultiplexor 251 into multiple streams of packets which are temporarily stored in incoming packet buffer 252. In one embodiment, at the appropriate time and in accordance with a barrier scheme disclosed herein, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexor 261 extracts the packets and creates a multiplexed signal which is transmitted via external interface transmitter 260.

FIG. 2C illustrates an embodiment of a line card 270 and a switch interface 290, which could correspond to line card 159 and input/output interfaces 169 illustrated in FIG. 2C. The embodiment of line card 270 illustrated in FIG. 2C includes control logic 271 implementing a barrier scheme in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals 201 (FIG. 2), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexor 285 extracts the packets and creates a multiplexed signal which is transmitted via external interface transmitter 284. In one embodiment, control logic 271, referencing a data structure within control logic 271 or memory 272, to implement a barrier scheme.

The embodiment of input/output interface 290 illustrated in FIG. 2C includes control logic 291 implementing a barrier scheme in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to line card 270. In one embodiment, control logic 291, referencing a data structure within control logic 291 or memory 292, to implement a barrier scheme.

Figure 3A:
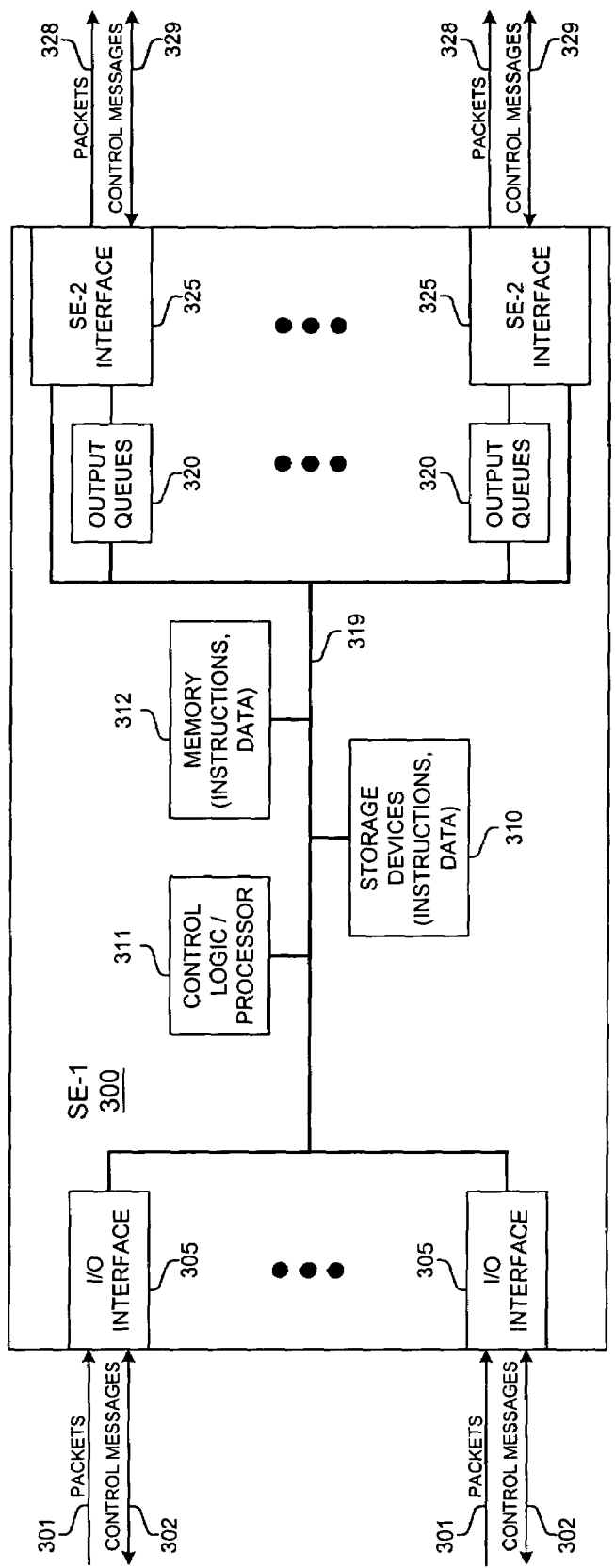
FIGS. 3A–C are block diagrams of exemplary embodiments including switching fabric components.
Figure 3B:
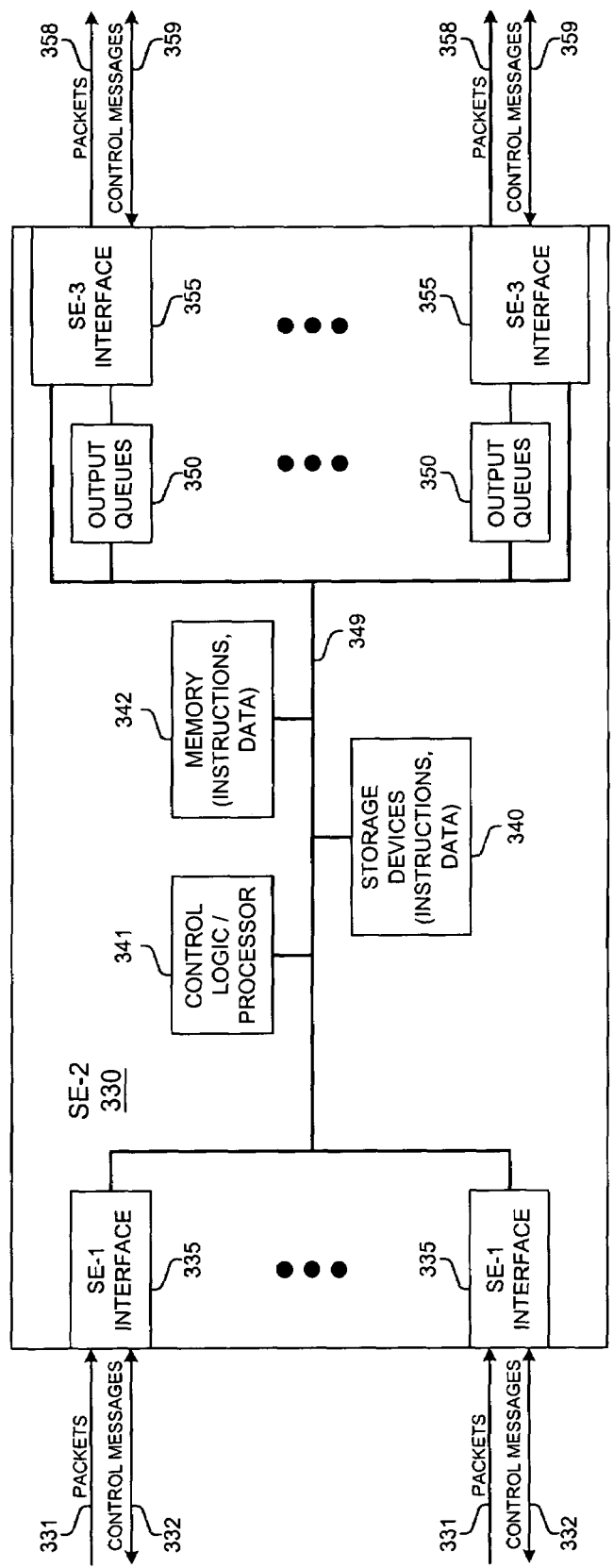
Figure 3C:
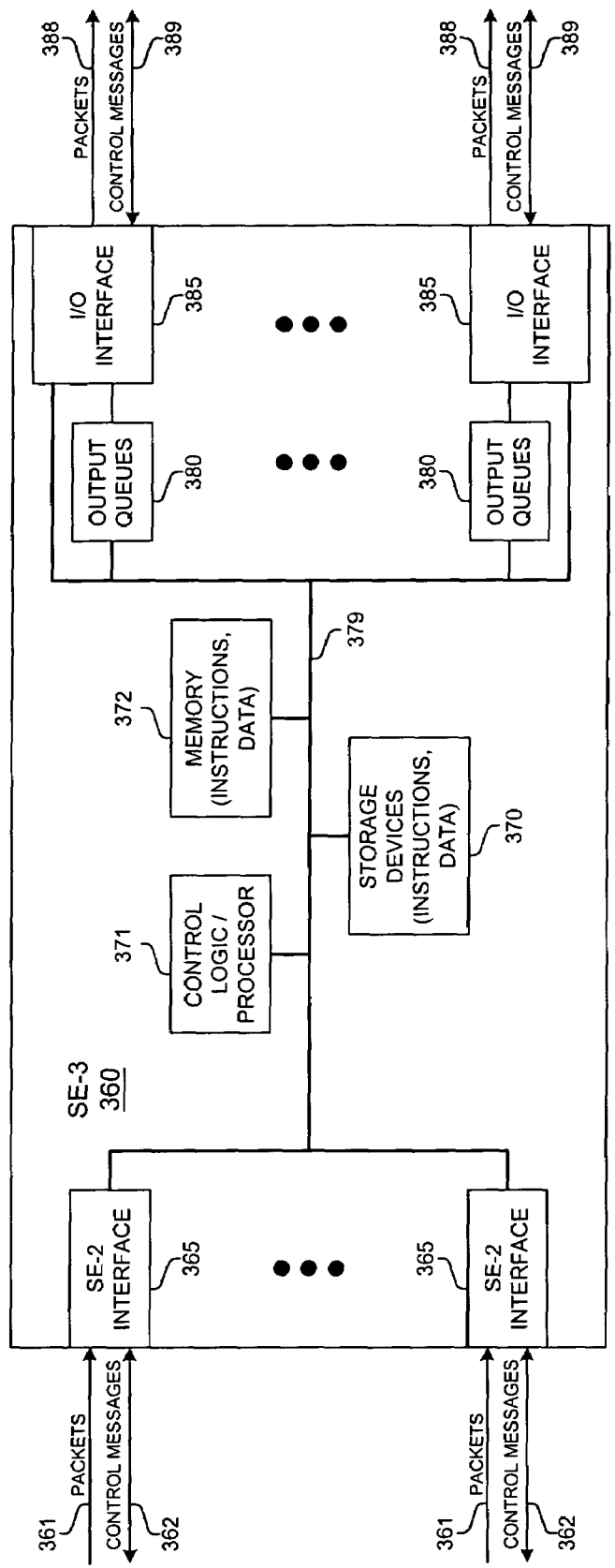

FIGS. 3A–C illustrate exemplary embodiments including switching elements and/or their components in accordance with certain embodiments of the invention. FIG. 3A is a block diagram of a first stage switching element, SE-1 300. FIG. 3B is a block diagram of a second stage switching element SE-2 330. FIG. 3C is a block diagram of a third stage switching element SE-3 360. As would be understood by one skilled in the art, the invention is not limited to these or any other embodiment described herein. Rather, the invention as described herein is extensible to an unlimited number of embodiments and implementations.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing a barrier scheme in accordance with certain embodiments of the invention. Storage devices 310 are another type of computer-readable medium, and typically comprise disk drives, diskettes, networked services, tape drives, and other storage devices. Storage devices 310 typically store computer-executable instructions to be executed by control logic 311 and/or data which is manipulated by control logic 311 for implementing a barrier scheme in accordance with certain embodiments of the invention.

Each SE-1 300 receives packets 301 and exchanges control messages 302 over one or more links with one or more input interfaces (not shown) such as input/output interface 290 (FIG. 2C) via I/O interfaces 305. In other embodiments, data packets and control messages are transmitted over a common link or links, and/or communication interfaces have a folded topology. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 may be used to implement a barrier scheme. Outgoing packets and control messages are placed in output queues 320. In one embodiment, there is an output queue 320 for each destination, or for each class of service for each destination. In one embodiment, each output queue 320 implements a barrier scheme according to the invention. In one embodiment, each input and/or output interface 305, 325 implements a barrier scheme according to the invention.

FIG. 3B illustrates an embodiment of SE-2 330 comprising control logic and/or processor 341 (hereinafter "control logic"), memory 342, storage devices 340, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing a barrier scheme in accordance with certain embodiments of the invention. Storage devices 340 are another type of computer-readable medium, and typically comprise disk drives, diskettes, networked services, tape drives, and other storage devices. Storage devices 340 typically store computer-executable instructions to be executed by control logic 341 and/or data which is manipulated by control logic 341 for implementing functionality in accordance with certain embodiments of the invention.

Each SE-2 330 receives packets 331 and exchanges control messages 332 over one or more links with one or more SE-1 elements (not shown) such as SE-1 300 (FIG. 3A) via SE-1 interfaces 335. In other embodiments, data packets and control messages are transmitted over a common link or links, and/or communication interfaces have a folded topology. For example, the communications functions of SE-1 interface 335 and SE-3 interface 355 could be combined, which is particularly useful in an embodiment where SE-1 300 (FIG. 3A) and SE-3 360 (FIG. 3C) are implemented on a single component. (e.g., chip or circuit board). Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1 300 and (b) SE-2 330 and SE-3 360 are the same links. Control logic 341 may implement a barrier scheme. Outgoing packets and control messages are placed in output queues 350. In one embodiment, there is an output queue 350 for each destination, or for each class of service for each destination. In one embodiment, each output queue 350 implements a barrier scheme according to the invention. In one embodiment, each input and/or output interface 335, 355 implements a barrier scheme according to the invention.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality in accordance with certain embodiments of the invention. Storage devices 370 are another type of computer-readable medium, and typically comprise disk drives, diskettes, networked services, tape drives, and other storage devices. Storage devices 370 typically store computer-executable instructions to be executed by control logic 371 and/or data which is manipulated by control logic 371 for implementing a barrier scheme in accordance with certain embodiments of the invention.

Each SE-3 360 receives packets 361 and exchanges control messages 362 over one or more links with one or more SE-2 elements (not shown) such as SE-2 330 (FIG. 3B) via SE-2 interfaces 365. In other embodiments, data packets and control messages are transmitted over a common link or links, and/or communication interfaces have a folded topology. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing flow control information, and updates its flow control data structure stored in memory 372. In one embodiment, there is an output queue 380 for each destination, or for each class of service for each destination. In one embodiment, each output queue 380 implements a barrier scheme according to the invention. In one embodiment, each input and/or output interface 365, 385 implements a barrier scheme according to the invention.

The descriptions herein with reference to all the figures describe receiving barrier messages and transitions from multiple sources. Of course within a system, some sources or links may be currently unavailable, so the descriptions herein typically refer to the currently active links, planes, etc.

FIGS. 4A–E depicts one set of snapshots of an operation of changing a barrier phase in a packet switching fabric 400. The architecture of this illustrated switching fabric 400 is first described, which is then followed by a description of an embodiment of a barrier state transition. Of course, the embodiment of the barrier scheme described in regards to the particular switching fabric 400 and the order of sending of barrier requests and acknowledgements are not limiting. Rather, FIGS. 4A–E illustrate the operation at a particular moment of one embodiment, which may be abstracted to and/or modified for other switching architectures, and computer and communications systems.

FIGS. 4A–E illustrate a packet switching fabric having multiple I/O interfaces 410A–P. Note, the illustration of the topology of packet switching fabric 400 represents the same I/O interfaces 410A–P on both the left and right sides of the figures for simplicity of illustration and ease of understanding, rather than drawing links back to one representation of I/O interfaces 410A–P. Also, switch elements SE-1 411A–D and SE-3 413A–D are illustrated separately; however in certain embodiments such as that illustrated in FIG. 1C, some of these switching elements 411A–D and 413A–D may be implemented in the same component. Moreover, other embodiments employ a different packet switch topology, such as, but not limited to a non-folded network, which provides some mechanism to convey barrier requests and acknowledgements from the output or egress portion of the packet switch back to the input or ingress portion.

In general, the barrier state transition is initiated when each I/O interface 410A–P sends to their connected SE-1 elements 411A–D a barrier request to change to a next barrier state. After an SE-1 element 411A–D has received such a barrier request on all incoming links, the switching node propagates the barrier request to SE-2 elements 412A–D. If there are packets in any outgoing queues, the barrier request is placed in the queues after these queued packets, to ensure that the barrier request is sent to a next stage in this order. After an SE-2 element 412A–D has received such a barrier request on all incoming links, the switching node propagates the barrier request to SE-3 elements 413A–D. If there are packets in any outgoing queues, the barrier request is placed in the queues after these queued packets, to ensure that the barrier request is sent to a next stage in this order. After an SE-3 element 413A–D has received such a barrier request on all incoming links, the switching node propagates the barrier request to connected I/O interfaces 410A–P. If there are packets in any outgoing queues, the barrier request is placed in the queues after these queued packets, to ensure that the barrier request is sent to a next stage in this order.

Upon receiving barrier requests on its ingress portion over all links, each I/O interface 410A–P relays a barrier acknowledgement to its egress portion, which results each I/O interface 410A–P sending a barrier acknowledgement in much the same way as described supra, except barrier acknowledgements are typically sent immediately out rather than being placed in a queue, and each I/O interface 410A–P changes its barrier state on its egress portion causing sent packets to indicate the new barrier ack state. Upon receiving all the barrier acknowledgements over all links, each I/O interface 410A–P switches its barrier state on its ingress portion, and then an I/O interface 410A–P may fully manipulate (e.g., resequence, reassemble, send, place in an output queue, etc.) all packets marked with the previous barrier state as it knows that every packet from the previous barrier state has been received. Barrier requests and acknowledgements may be included in data and/or control packets, or relayed over signaling lines.

Figure 4A:
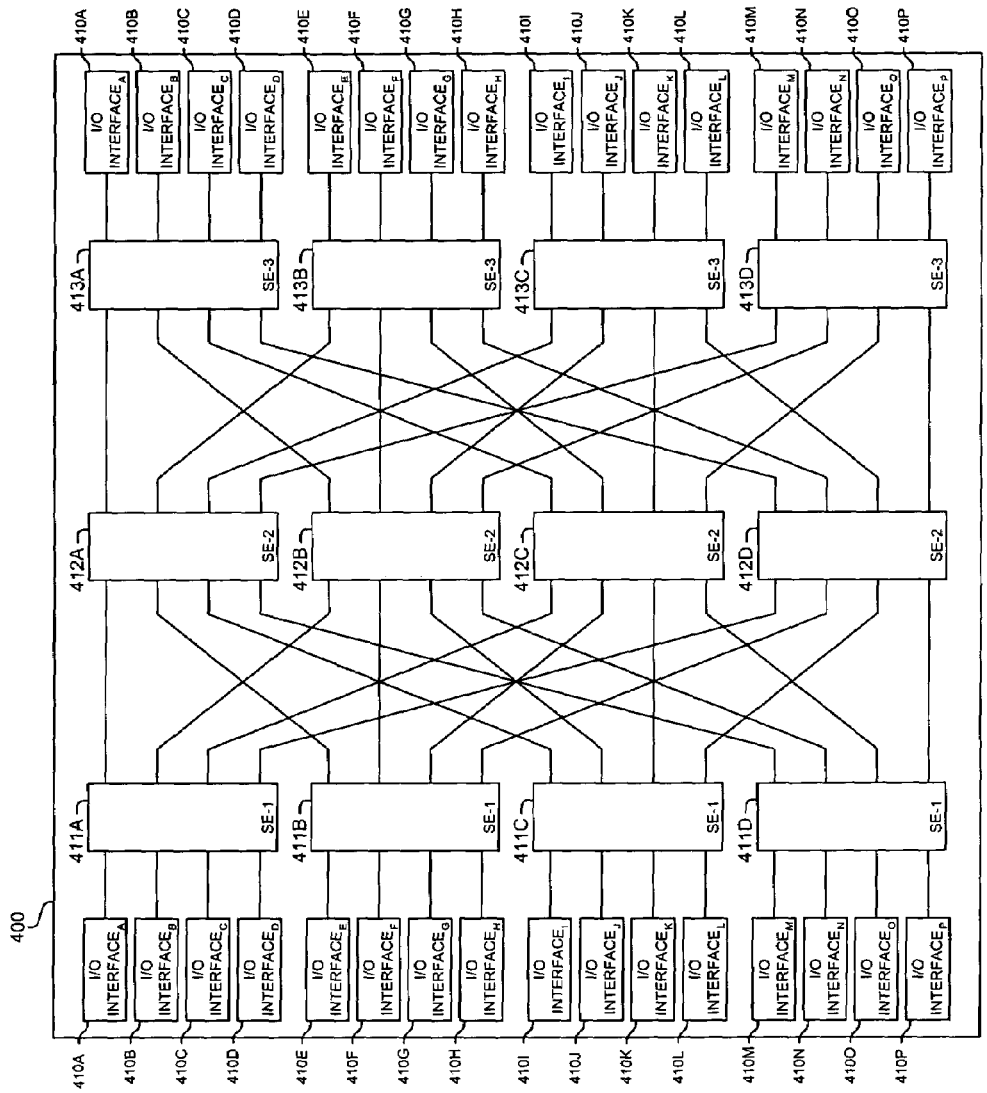
FIGS. 4A–E are block diagrams illustrating one embodiment of changing barrier phases within a switching fabric.
Figure 4B:
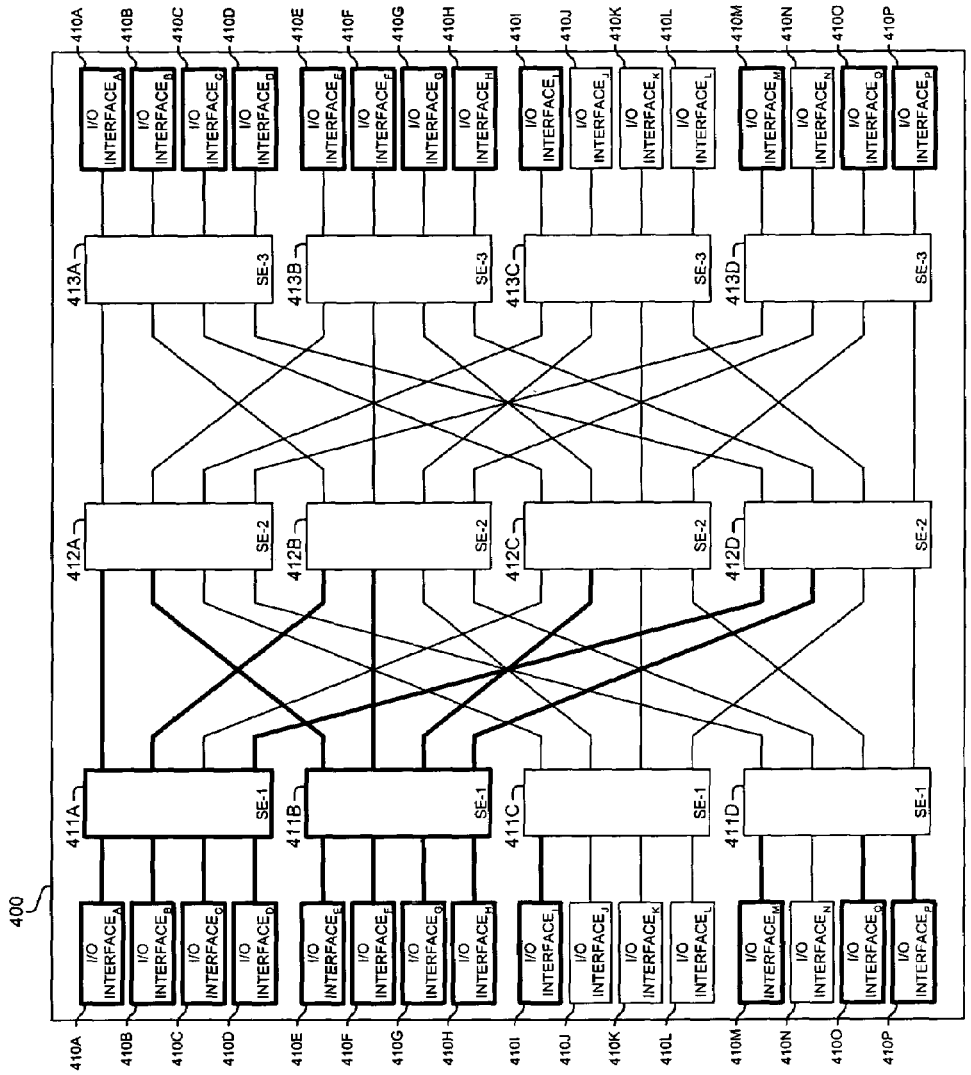
Figure 4C:
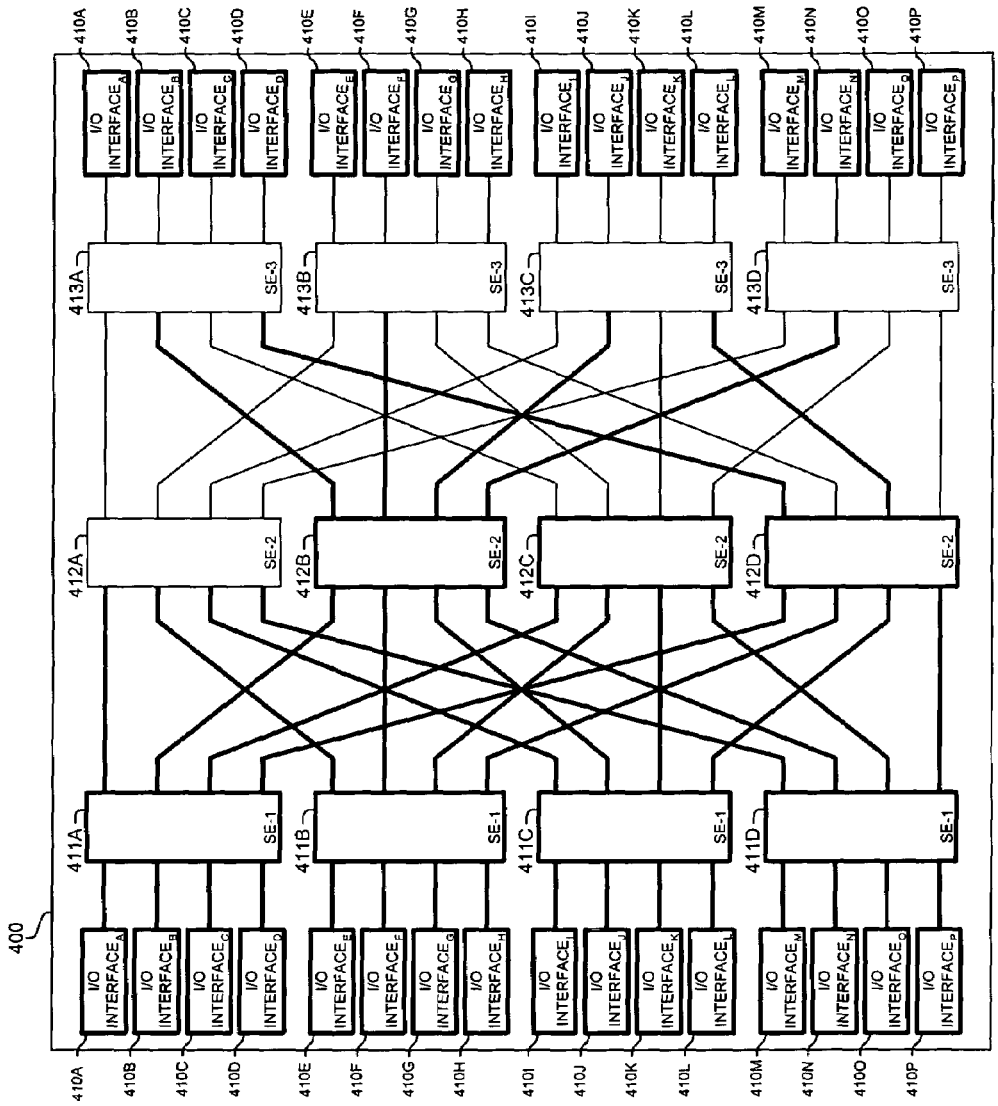
Figure 4D:
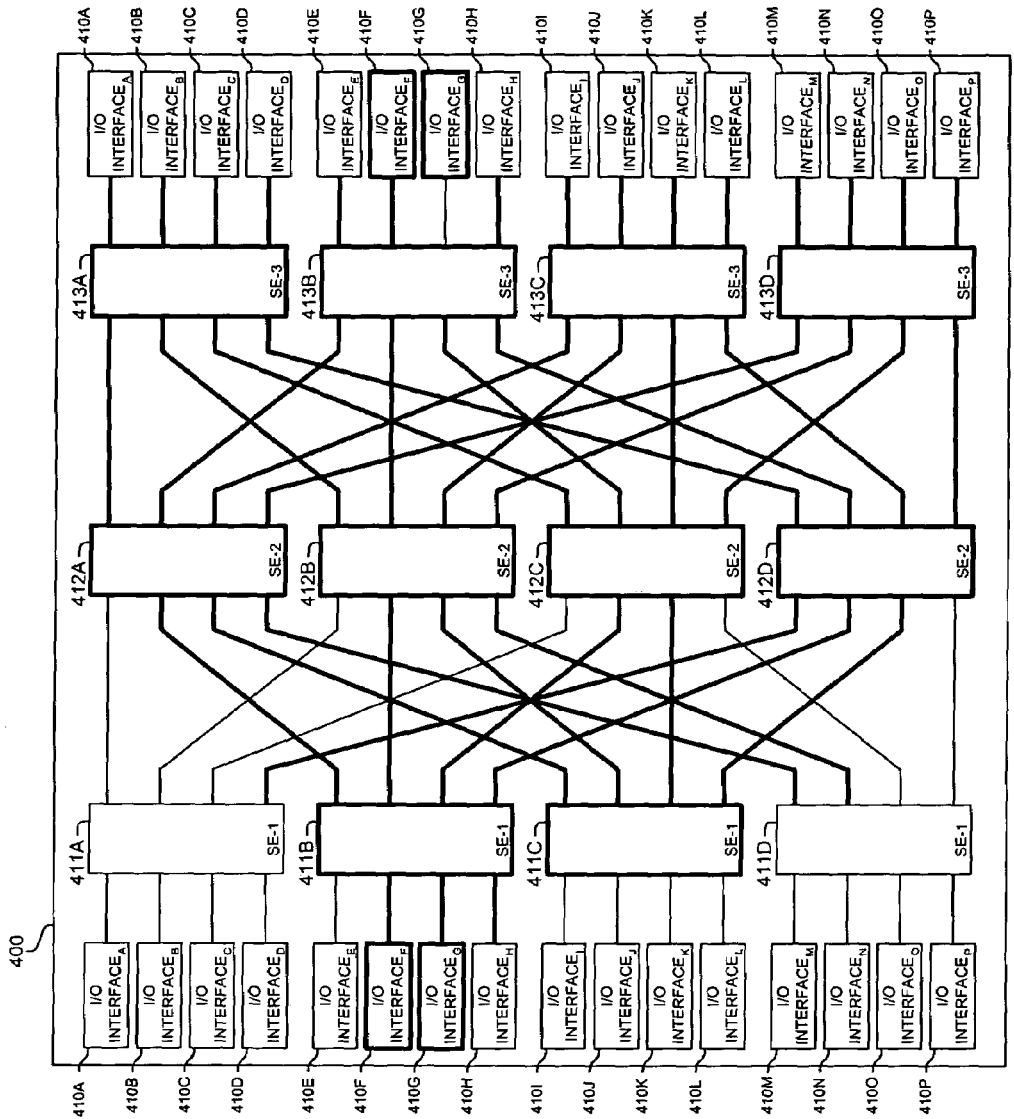
Figure 4E:
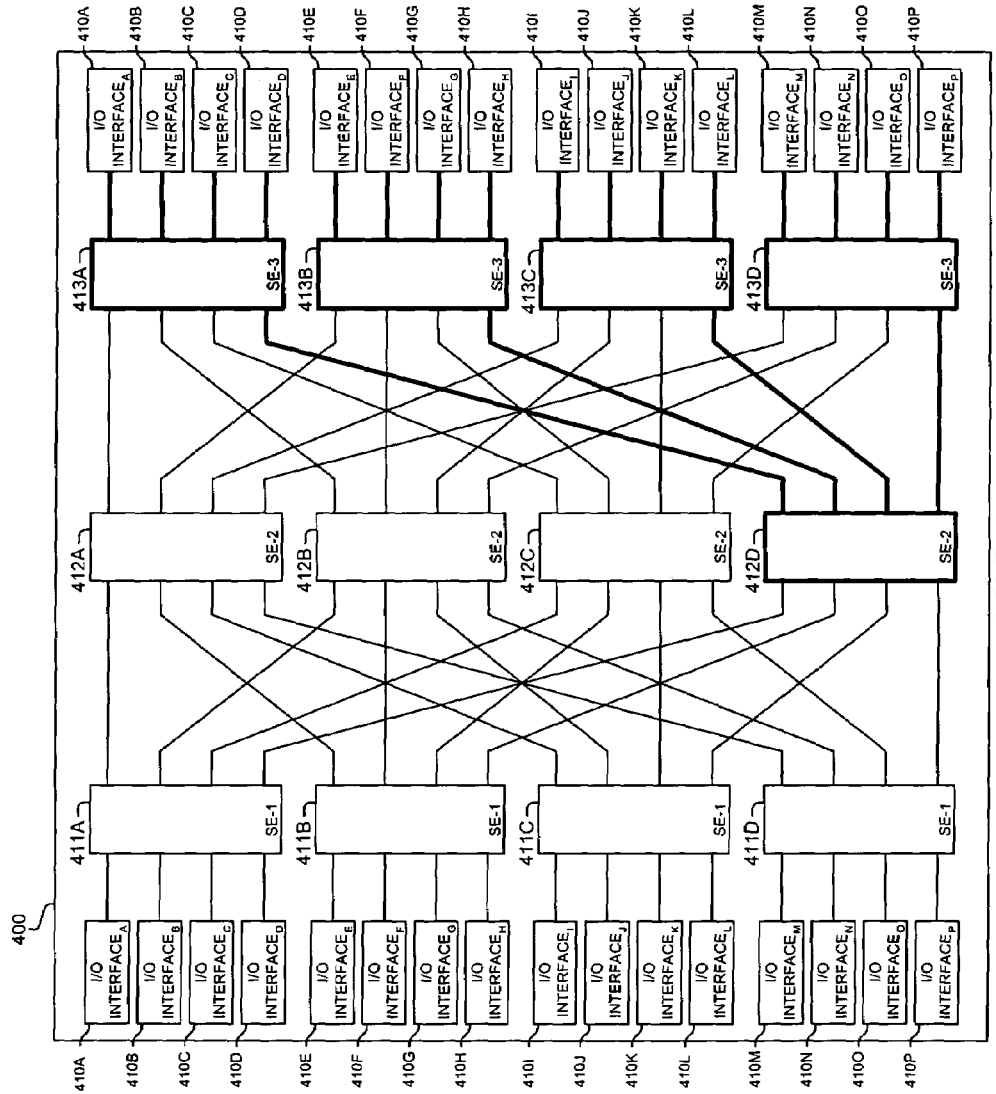

Turning now to one illustration, shown in FIG. 4A, are no highlighted elements indicating that all the packet switching fabric 400 are in the same barrier state. Next, in FIG. 4B, I/O interfaces 410A–410I, 410M, and 410O–P are highlighted to indicate that they are initiating a request for packet switching fabric 400 to migrate to a next barrier state. SE-1 411A–B are highlighted to indicate that they have received a barrier request over all their incoming links, and therefore, may propagate the barrier request to downstream nodes. Note, one output link of SE-1 411A is not highlighted to indicate that there might be a delay in relaying the barrier request. Such a delay may be due to a set of queued packets from the previous state which must proceed prior to the further propagation of the barrier request from SE-1 411A. Turning to FIG. 4C, more nodes 411C–D, 412B–D are highlighted to indicate that they have received the requisite or predetermined number of barrier requests over each of the links from the previous nodes. Note, that I/O interfaces 410A–P are all highlighted. Next, as illustrated in FIG. 4D, I/O interfaces 410A–E, H–P are no longer highlighted to indicate that barrier acknowledgement messages are being propagated, and have been received over all input links of SE-1 411A, C–D, and over non-highlighted input links for SE-2's 412A–D. The barrier acknowledgements are further propagated in the same manner as illustrated by FIG. 4E, until all nodes receive the acknowledgement, with the representation shown in FIG. 4A next in this exemplary snapshot illustrations of series of barrier requests and acknowledgements.

Figure 5A:
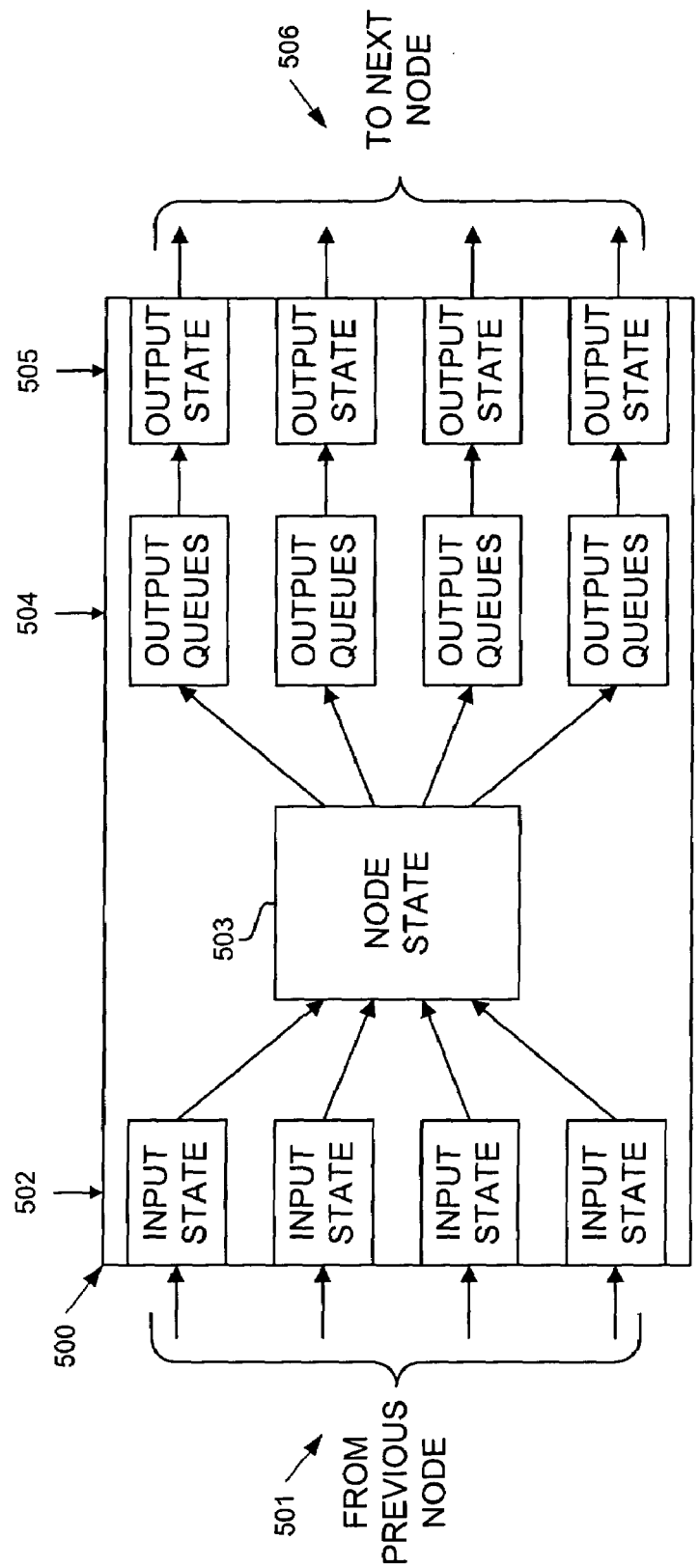
FIGS. 5A–B are block diagrams of logical embodiments of a node (e.g., switching element, input/output interface, etc.) for propagating barrier requests and acknowledgements.

FIG. 5A provides a logical block diagram of one embodiment of a node 500 (e.g., a switching element, I/O interface, line card, etc.) in terms on how it receives, processes, and propagates a barrier request for one barrier context. Each node 500 might have more than one barrier context operating currently, such as one for each priority and/or class of service. Barrier request messages or signals 501 are received from a previous node, with an input state 502 resulting for each input link. When an input state 502 has received the predetermined or requisite number of barrier requests, the particular input state 502 will relay a barrier request to node state 503. When node state 503 has received a barrier request from each input state 502, then node state 503 will propagate a predetermined number of barrier requests for each output 506 by placing a barrier request message in each of the output queues. In one embodiment, an output queue is bypassed when the particular output queue is empty. When an output state 505 receives the predetermined requisite number of barrier requests from its corresponding output queue 504, the particular output state 505 relays the barrier request to a next node 506.

Figure 5B:
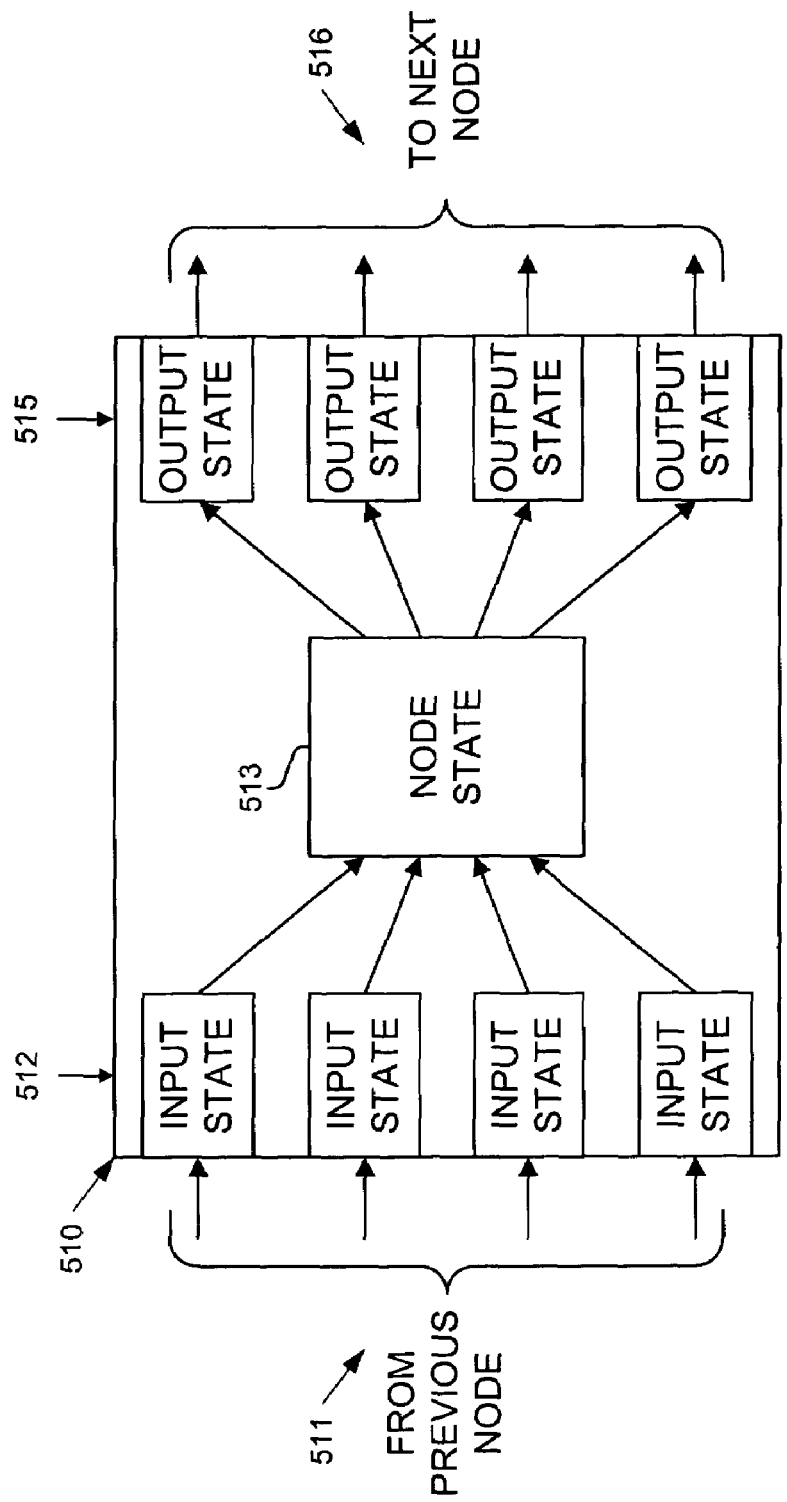

FIG. 5B provides a logical block diagram of one embodiment of a node 510 (e.g., a switching element, I/O interface, line card, etc.) in terms on how it receives, processes, and propagates a barrier acknowledgement for one barrier context. Each node 510 might have more than one barrier context operating currently, such as one for each priority and/or class of service. Barrier acknowledgement messages or signals 511 are received from a previous node, with an input state 512 resulting for each input link. When an input state 512 has received the predetermined or requisite number of barrier acknowledgements, the particular input state 512 will relay a barrier acknowledgement to node state 513. When node state 513 has received a barrier acknowledgement from each input state 512, then node state 513 will propagate a predetermined number of barrier acknowledgements for each output 516 by changing output state 515 to the barrier acknowledgement state, with each of the particular output states 515 relaying the barrier acknowledgement to a next node 516.

Figure 6:
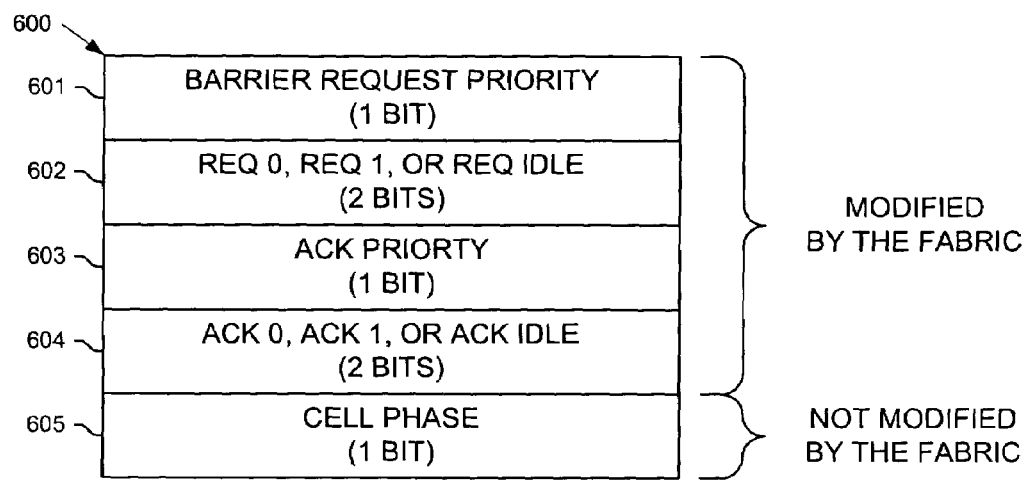
FIG. 6 is a block diagram of barrier fields included in data and/or control packets of one embodiment.

FIG. 6 is a block diagram of barrier fields 600 included in data and/or control packets of one embodiment which has two levels of priority and three barrier states. Rather than, or in addition to sending control packets or using barrier signals over control links, barrier request and acknowledgment information may be included (e.g., piggybacked) in data packets. In one embodiment, every packet or a subset thereof includes two barrier request fields 601–602, two barrier acknowledgement fields 603–604 and one field 605 identifying which of the two barrier states to which the packet belongs (i.e., the phase of a distribution element, the phase of the ingress part of an I/O interface, etc.). Barrier request priority field 601 identifies to which of two priorities or sets of barrier states the particular barrier request belongs. In one embodiment, field 605 is not used as the destinations may infer the barrier state of a packet from the received barrier transitions; however, this may induce additional delay and may result in the destination having to wait an additional barrier transition. Barrier request field 602 identifies to which of three states (barrier request initialization, barrier request state zero, barrier request state one) the barrier request belongs. Barrier acknowledgement field 603 identifies to which of two priorities or sets of barrier states the particular barrier acknowledgement belongs. Barrier acknowledgement field 604 identifies to which of three states (barrier acknowledgement initialization, barrier acknowledgement state zero, barrier acknowledgement state one) the barrier acknowledgement belongs. Many different embodiments of barrier information included in a packet or set over a control link are possible in keeping within the scope and spirit of the invention.

FIGS. 7A–F illustrate flow diagrams of one embodiment of a barrier scheme, including processing and propagating of barrier requests and acknowledgements by nodes of a packet switching system. In one embodiment, each of the nodes (source, switching, destination) maintains at least two operational states. The switching elements maintain a barrier request and a barrier acknowledgement state. The source nodes maintain a barrier request state and a barrier transmission acknowledgement state. The destination nodes maintain a barrier transmission acknowledgement state and a barrier receive acknowledgement state. Upon initialization, each of the nodes is set to an idle state which can transition into an operational state in numerous ways, including, but not limited to, waiting until all input links have transitioned, forcing a change after a predetermined delay if all the links have not transitioned, or via some external agent forcing the transition.

Figure 7A:
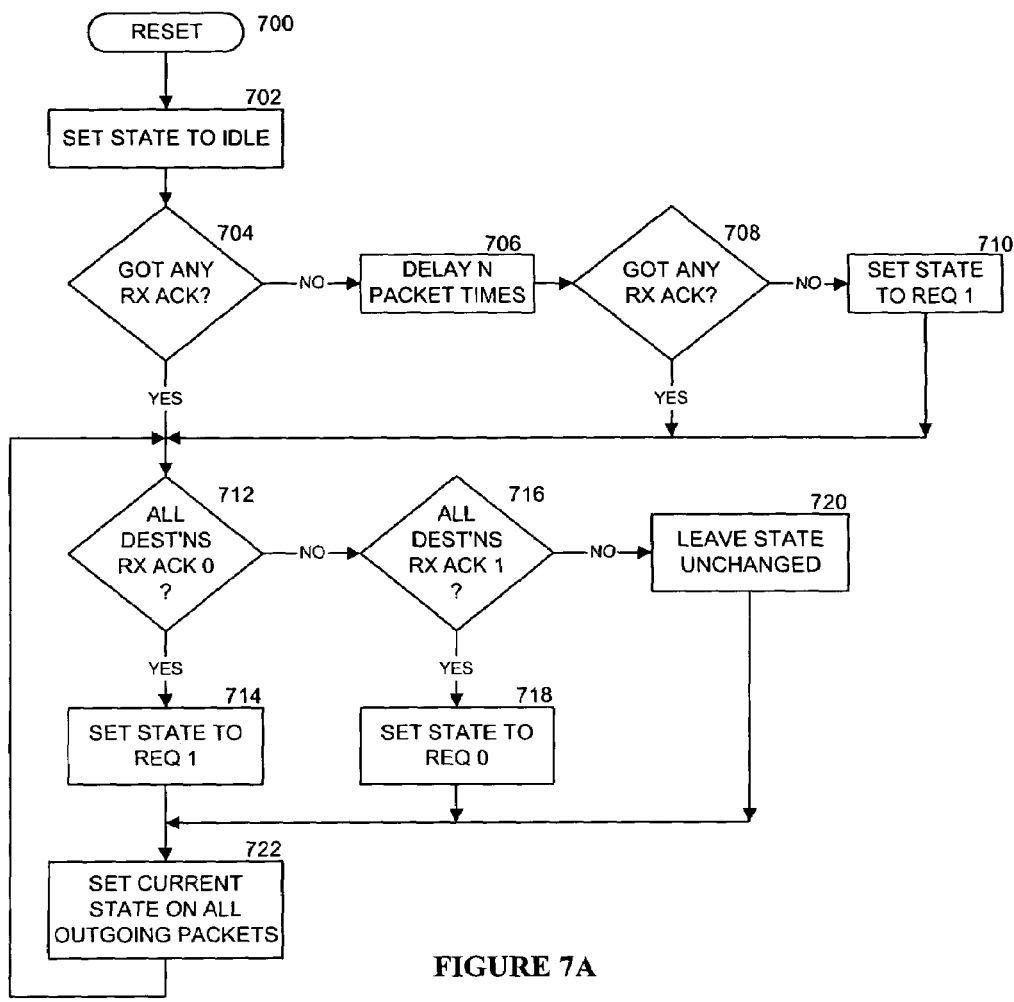
FIGS. 7A–7F are flow/state diagrams for updating barrier states in elements of one embodiment.

FIG. 7A illustrates one embodiment of barrier processing and propagation by a source node (e.g., a distribution node, an egress portion of an I/O interface, etc.) The process is reset in process block 700, and then proceeds to process block 702 to set the barrier request state of the source node is set to idle. Next in process block 704, if an acknowledgement has not been received from a destination node (e.g., a resequencing and/or reassembly element, an ingress portion of an I/O interface, etc.), then processing proceeds to process block 706 where a predetermined delay of is imposed to wait for an acknowledgement. Next, as determined in process block 708, if an acknowledgement still has not been received, then the barrier request state of the source node is set to state barrier request one (REQ-1). Processing proceeds in process block 712, where if the node has received all the predetermined number of barrier acknowledgement zero (ACK-0) messages, then the barrier request state of the source node is set to REQ-1. Otherwise, processing proceeds to process block 716, where if the node has received all the predetermined number of barrier acknowledgement one (ACK-1) messages, then the barrier request state of the source node is set to state barrier request zero (REQ-0) in process block 718. Otherwise, the state of the source node remains the same as indicated by process block 720. Process block 722 indicates that the value of the current state (REQ-0 or REQ-1) is placed in all outgoing packets. Processing then returns to process block 712.

Figure 7B:
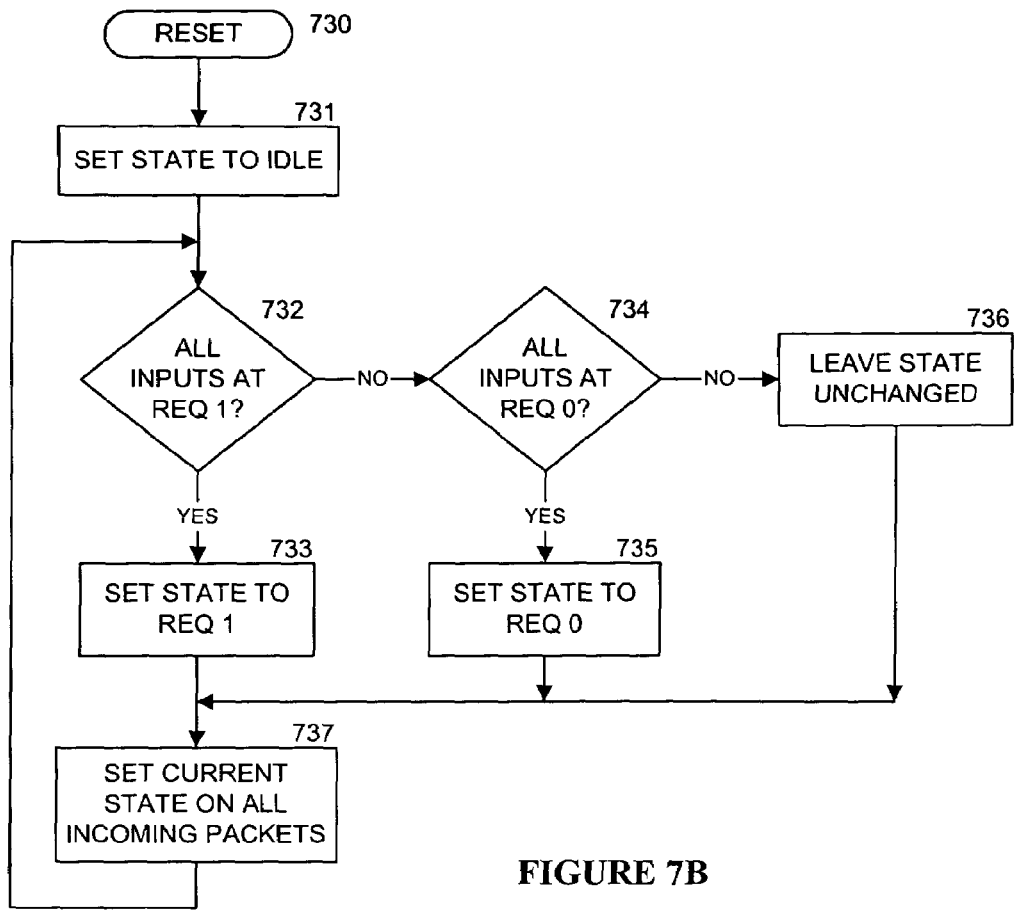

FIG. 7B illustrates one embodiment of barrier processing and propagation by a switching node. The process is reset in process block 730, and then proceeds to process block 731, where the current barrier request state of the switching node is set to idle. Next, as determined in process block 732, if all inputs are at state REQ-1, then the current barrier request state of the switching node is set to state REQ-1 in process block 733. Otherwise, as determined in process block 734, if all inputs are at state REQ-0, then the current barrier request state of the switching node is set to state REQ-0 in process block 735. Otherwise, the current barrier request state of the switching node is left unchanged as indicated in process block 736. The current barrier request state of the switching node is added on all incoming packets, as indicated in process block 737. In another embodiment, the current barrier request state of the switching node is added on all outgoing packets. Processing returns to process block 732.

Figure 7C:
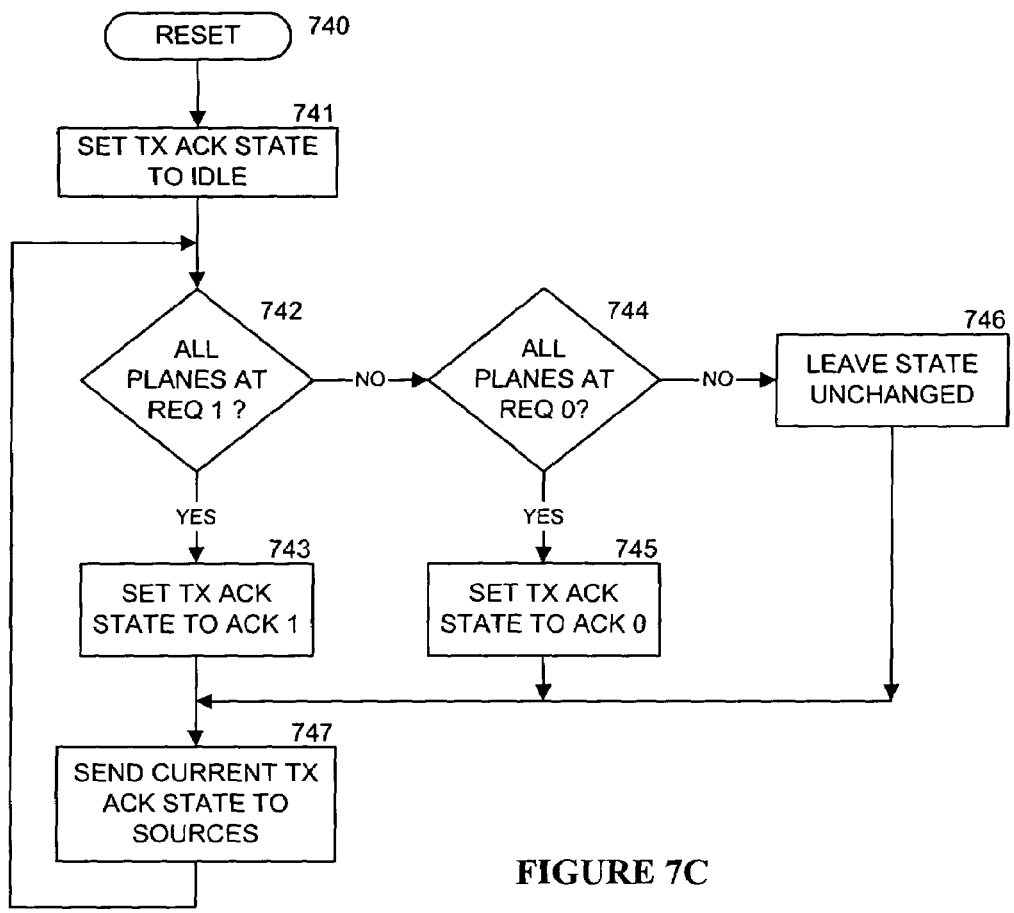

FIG. 7C illustrates one embodiment of barrier processing and propagation by a destination node. The process is reset in process block 740, and then proceeds to process block 741, where the barrier transmission acknowledgement state of the destination node is set to idle. Next, as determined in process block 742, if all planes (e.g. all inputs to the destination node) are at state REQ-1, then the barrier transmission acknowledgement state of the destination node is set to state ACK-1 in process block 743. Otherwise, as determined in process block 744, if all planes (e.g. all inputs to the destination node) are at state REQ-0, then the barrier transmission acknowledgement state of the destination node is set to state ACK-0 in process block 745. Otherwise, the barrier transmission acknowledgement state of the switching node is left unchanged as indicated in process block 746. The current barrier transmission acknowledgement state of the destination node is sent to all source nodes as indicated in process block 747. Processing returns to process block 742.

Figure 7D:
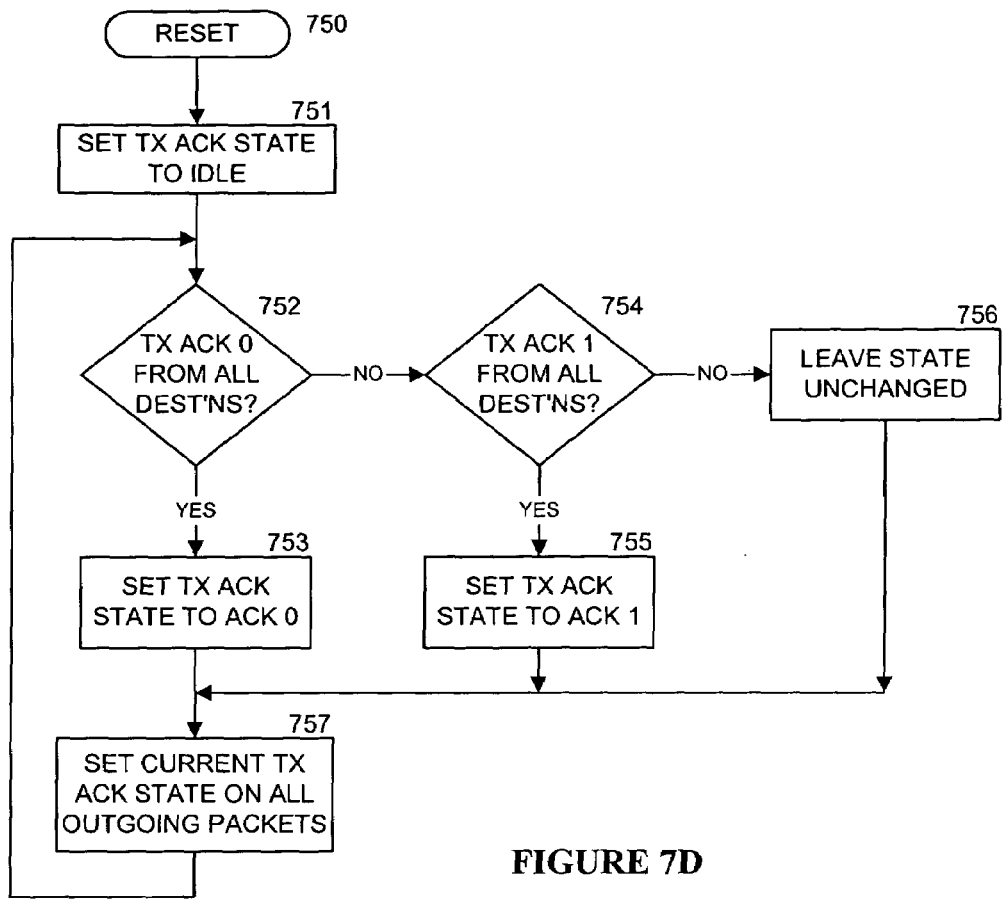

FIG. 7D further illustrates one embodiment of barrier processing and propagation by a source node. The process is reset in process block 750, and then proceeds to process block 751, where the barrier transmission acknowledgement state of the source node is set to idle. Next, as determined in process block 752, if all transmission acknowledgement messages of state ACK-0 have been received from all connected destination nodes, then the barrier transmission acknowledgement state of the source node is set to state ACK-0 in process block 753. Otherwise, as determined in process block 754, if all transmission acknowledgement messages of state ACK-1 have been received from all connected destination nodes, then the barrier transmission acknowledgement state of the source node is set to state ACK-1 in process block 755. Otherwise, the barrier transmission acknowledgement state of the source node is left unchanged as indicated in process block 756. The current barrier transmission acknowledgement state of the source node is included in all outgoing packets as indicated in process block 757. Processing returns to process block 752.

Figure 7E:
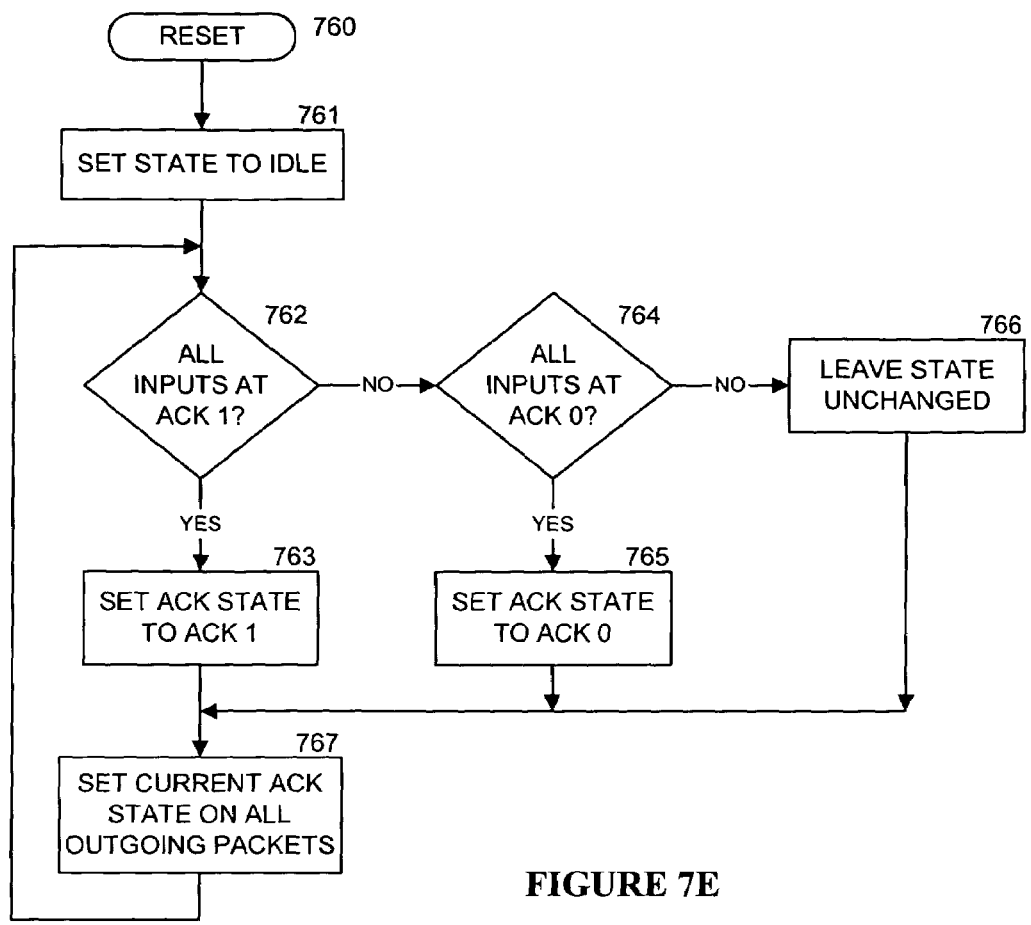

FIG. 7E further illustrates one embodiment of barrier processing and propagation by a switching node. The process is reset in process block 760, and then proceeds to process block 761, where the current barrier acknowledgement state of the switching node is set to idle. Next, as determined in process block 762, if all inputs are at state ACK-1, then the barrier acknowledgement state of the switching node is set to state ACK-1 in process block 763. Otherwise, as determined in process block 764, if all inputs are at state ACK-0, then the barrier acknowledgement state of the switching node is set to state ACK-0 in process block 765. Otherwise, the barrier acknowledgement state of the switching node is left unchanged as indicated in process block 766. The current barrier acknowledgement state of the switching node is added on all outgoing packets as indicated in process block 767. Processing returns to process block 762.

Figure 7F:
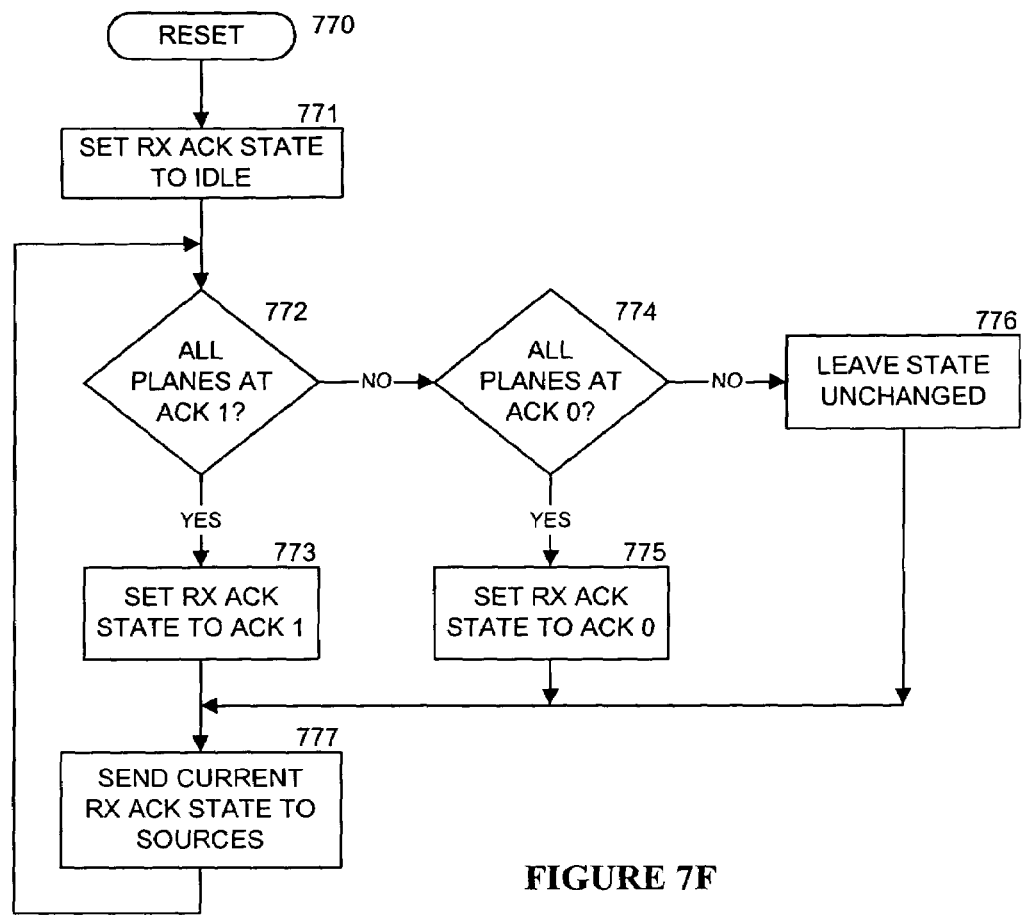

FIG. 7F further illustrates one embodiment of the processing of barrier acknowledgement messages for a destination node. The process is reset in process block 770, and then proceeds to process block 771, where the barrier receive acknowledgement state of the destination node is set to idle. Next, as determined in process block 772, if all planes (e.g. all inputs to the destination node) are at state ACK-1, then the barrier receive acknowledgement state of the destination node is set to state ACK-1 in process block 773. Otherwise, as determined in process block 774, if all planes (e.g. all inputs to the destination node) are at state ACK-0, then the barrier receive acknowledgement state of the destination node is set to state ACK-0 in process block 775. Otherwise, the barrier receive acknowledgement state of the switching node is left unchanged as indicated in process block 776. The current barrier receive acknowledgement state of the destination node is sent to all source nodes as indicated in process block 777. Processing returns to process block 772.

Figure 8:
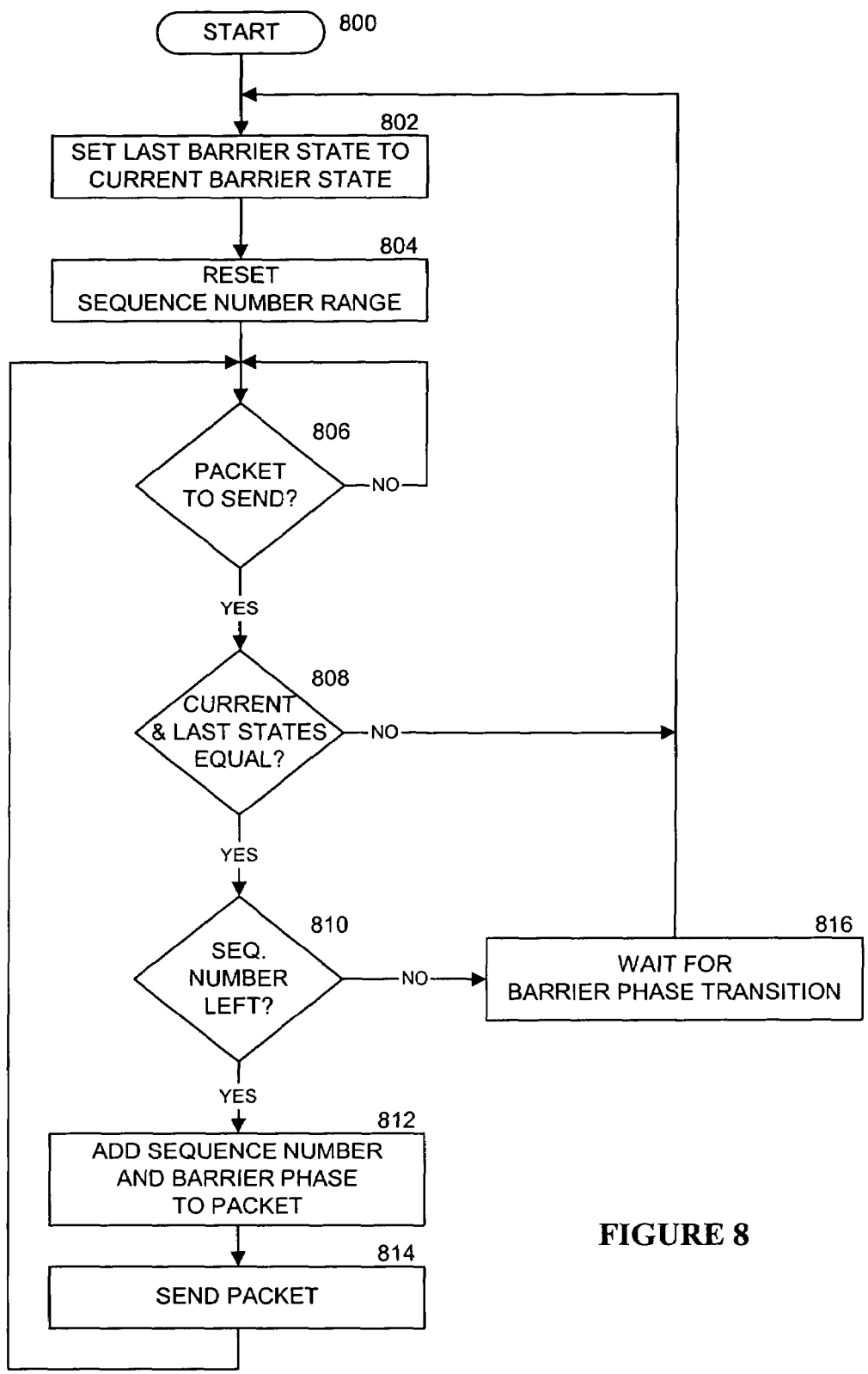
FIG. 8 is a flow diagram illustrating one embodiment of a process of a source node adding sequence numbers to packets in accordance with a barrier state of the source node.

FIG. 8 illustrates a flow diagram of one embodiment of a process of a source node adding sequence numbers to packets in accordance with a barrier state of the source node. Processing begins at process block 800, and proceeds to process block 802 where the last barrier state variable is set to the current barrier state. In process block 804, the sequence number range for use within a packet phase is reset. Until there is a packet to send, processing loops at process block 806. Next, if the current barrier state and state stored in the last barrier state variable are not equal as determined in process block 808, then processing returns to process block 802 to reset and reuse the sequence number space for the current barrier phase. Otherwise, if there are sequence numbers remaining in the sequence number space available to the current barrier phase as determined in process block 810, then the next sequence number and current barrier phase is added to the packet in process block 812, the packet is sent in process block 814, and processing returns to process block 806 to handle more packets. Otherwise, if in process block 810 it was determined that the sequence number space has been exhausted for the current barrier phase, then processing waits for a barrier phase transition in process block 816, which then allows processing to return to process block 802 to reset and reuse the sequence number space for the new current barrier phase.

In other embodiments, rather than resetting a sequence number space, a counting space is reset to limit the number of packets sent in a barrier phase. These embodiments may be particularly useful when sequence numbers are not added to packets, such as in an embodiment which uses time stamps to resequence streams of packets at a destination. In certain of these embodiments, the counting space would be reset in process block 804, the counter would be checked in process block 810, and a timestamp would be added in process block 812 or process block 812 would not be performed. Additionally, one embodiment does not include the barrier phase in the packet such as that indicated as added in process block 812. In this embodiment, the destinations may infer the barrier state of a packet from the received barrier transitions; however, this may induce additional delay and may result in the destination having to wait an additional barrier transition.

Figure 9:
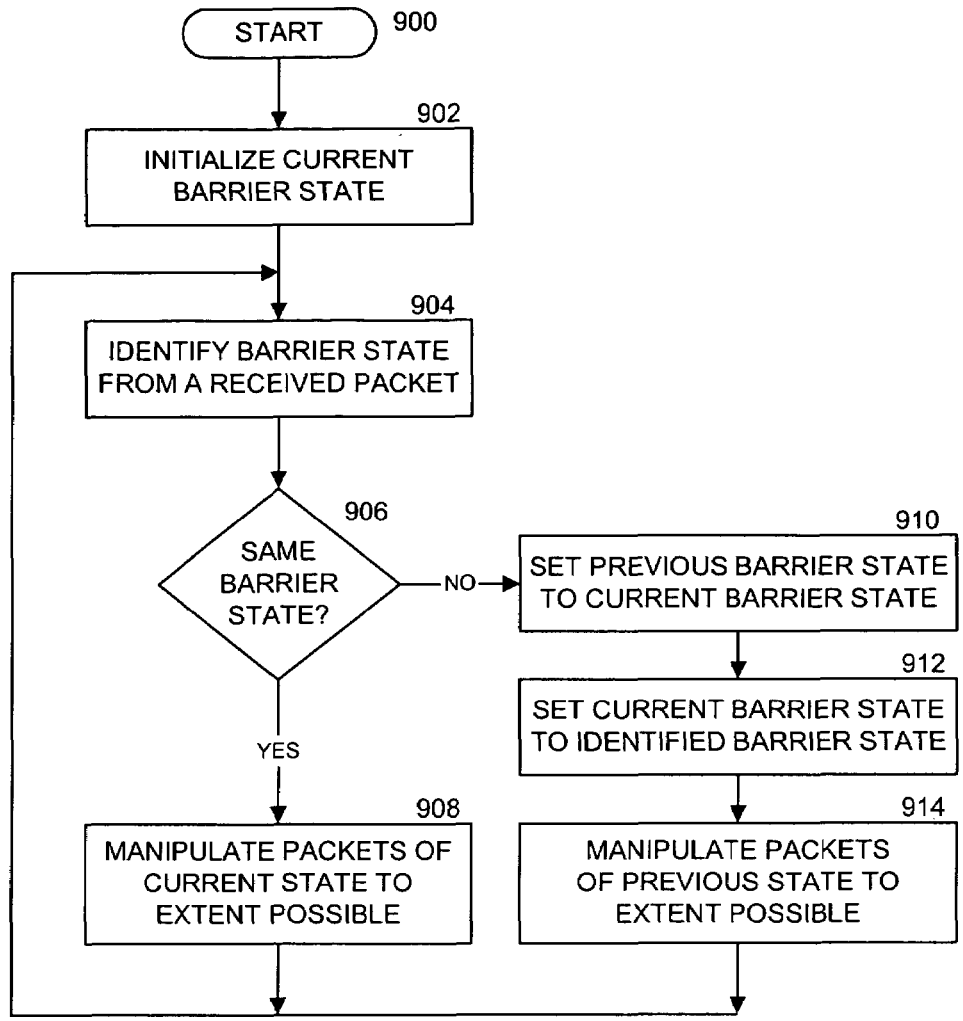
FIG. 9 is a flow diagram illustrating one embodiment of a process of a destination node manipulating packets in accordance with a barrier state of the packets and destination node.

FIG. 9 illustrates a flow diagram of one embodiment of a process of a destination node manipulating packets in accordance with a barrier state of the packets and destination node. Other processes, such as receiving packets and processing and propagating barrier requests are not included in this process, but are rather being performed concurrently in one embodiment. Processing begins at process block 900, and proceeds to process block 902 where the current barrier state of the destination node is initialized. Next, in process block 904, the barrier state of a received packet is identified. Next, as determined in process block 906, if the barrier states of the destination node and the received packet are the same, then processing proceeds to process block 908 wherein the packets having the current state are manipulated to the extent possible. For example, packets can be resequenced, reassembled, output queued, and/or sent out if, for example, the requisite sequence numbers have been received by the destination node. At this point, the destination node does not know whether more packets will be received having the current barrier state, which may effect this manipulation.

Otherwise, processing proceeds to process block 910, where the previous state is set to the current state. In process block 912, the current state is updated to reflect the identified state of the received packet. Next, in process block 914, the packets belonging to the previous barrier state are manipulated to the extent possible, as the destination node knows that no packets will be subsequently received which are identified with the previous barrier state. In many instances, all packets belonging to the previous barrier state may be manipulated in process block 914. However, for example, in the case of reassembling of a larger packet comprised of several packets of different barrier states sent through a packet switching system, the packet switching system may be required to wait an additional number of barrier phase transitions before being able to determine that one or more of its packets have been lost or discarded. Processing then returns to process block 904.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for routing a plurality of packets between a first source of a plurality of sources and a first destination of a plurality of destinations in a packet switching system, the method comprising:

each of the plurality of sources maintaining at least one source state indication;

each of the plurality of destinations maintaining at least one destination state indication;

the first source sending a first set of packets of the plurality of packets to the first destination, each packet of the first set of packets including a first state indication reflected in one of the at least one source state indications maintained in the first source;

after sending the first set of packets, the first source sending a source barrier message over each of a plurality of paths leading to the first destination through the packet switching system;

in response to receiving a destination barrier message generated in response to said sent plurality of source barrier messages, the first destination recognizing a barrier transition or a new barrier state and updating one of the at least one destination state indication; and the destination manipulating at least one packet of the first set of packets in response the barrier transition or the new barrier state.

2. The method of claim 1, comprising:

each of the plurality of destinations relaying a barrier state indication of a barrier transition or the new barrier state to at least one of the plurality of sources;

in response to receiving a first predetermined number of barrier state indications, each of the at least one of the plurality of sources sending a source barrier acknowledgement message over each of a plurality of paths leading from the at least one of the plurality of sources;

after receiving a second predetermined number of destination acknowledgement messages, each of the plurality of destinations relaying a barrier acknowledgement indication to the at least one of the plurality of sources; and in response to receiving the first predetermined number of barrier acknowledgement indications, each of the at least one of the plurality of sources updating at least one of said at least one source state indication.

3. A method performed by a switching element of a packet switching system, the method comprising:

maintaining a plurality of output queues for containing output packets to be sent over a plurality of outgoing links to a plurality of other components of the packet switching system maintaining a barrier state;

updating the barrier state in response to receiving a barrier state transition request on each of a plurality of incoming links;

placing input packet containing the barrier state transition request in at least each of the output queues that are occupied by at least one output packet; and sending output packets over the plurality of outgoing links to the plurality of other components of the packet switching system.

4. The method of claim 3, wherein said sending output packets includes sending said input packet containing the barrier state transition request out each of the outgoing plurality of links.

5. The method of claim 3, comprising sending an outgoing barrier acknowledgement message out each of the outgoing plurality of links in response to receiving an incoming barrier acknowledgement message over said each of a plurality of incoming links.

6. A packet switching system comprising:

a plurality of source elements, each of the plurality of source elements including: a source barrier state maintainer to indicate a current source state; a barrier accumulator to receive indications of a first subset of a plurality of barrier request and acknowledgement messages, to determine when a particular barrier request or acknowledgement message may be sent, and to update the current source state;

a plurality of switching nodes, each of the plurality of switching nodes including: a switching node barrier state maintainer to indicate a current node state; a switching node barrier accumulator to receive indications of a second subset of the plurality of barrier request and acknowledgement messages, to determine when a second particular barrier request or acknowledgement message may be forwarded to a next switching node or destination element, and to update the current node state; and a plurality of destination elements; each of the plurality of destination elements including: a destination barrier state maintainer to indicate a current destination state; a destination barrier accumulator to receive a third subset of the plurality of barrier request and acknowledgement messages, to determine when a particular barrier request or acknowledgement message may be relayed to at least one of the plurality of source elements, and to update the current destination state; and a packet sending mechanism to determine when a particular packet associated with a particular state may be manipulated or sent from the particular destination element based on the current or a previous destination state.

7. One or more computer-readable media containing computer-executable instructions for performing steps by a switching element of a packet switching system, said steps comprising:
- maintaining a plurality of output queues for containing output packets to be sent over a plurality of outgoing links to a plurality of other components of the packet switching system
- maintaining a barrier state;
- updating the barrier state in response to receiving a barrier state transition request on each of a plurality of incoming links;
- sending said input packets over the plurality of outgoing links to the plurality of other components of the packet switching system.

8. The computer-readable media of claim 7, wherein said sending output packets includes sending said input packet containing the barrier state transition request out each of the outgoing plurality of links.

9. The computer-readable media of claim 7, wherein said steps comprise: sending an outgoing barrier acknowledgement message out each of the outgoing plurality of links in response to receiving an incoming barrier acknowledgement message over said each of a plurality of incoming links.

10. A switching element of a packet switching system, the switching element comprising:
- means for maintaining a plurality of output queues for containing outputs packets to be sent over a plurality of outgoing links to a plurality of other components of the packet switching system
- means for maintaining a barrier state;
- means for updating the barrier state in response to receiving a barrier state transition request on each of a plurality of incoming links;
- means for placing input packet containing the barrier state transition request in at least each of the output queues that are occupied by at least one output packet; and
- means for sending output packets over the plurality of outgoing links to the plurality of other components of the packet switching system.

11. The switching element of claim 10, wherein said means for sending output packets includes means for sending said input packet containing the barrier state transition request out each of the outgoing plurality of links.

12. The switching element of claim 10, comprising means for sending an outgoing barrier acknowledgement message out each of the outgoing plurality of links in response to receiving an incoming barrier acknowledgement message over said each of a plurality of incoming links.

* * * * *

UNITED STATES PATENT AND TRADEMARK OFFICE
CERTIFICATE OF CORRECTION

PATENT NO. : 6,967,926 B1  
APPLICATION NO. : 09/752422  
DATED : November 22, 2005  
INVENTOR(S) : Williams et al.

Page 1 of 1

It is certified that error appears in the above-identified patent and that said Letters Patent is hereby corrected as shown below:

Col. 17, line 12, after "links;" insert the phrase -- placing input packet containing the barrier state transition request in at least each of the output queues that are occupied by at least one output packet; and --

Col. 18, line 2, replace "outputs" with -- output --

Signed and Sealed this

Third Day of July, 2007

JON W. DUDAS  
*Director of the United States Patent and Trademark Office*